(12) United States Patent
Lang et al.

(10) Patent No.: US 10,001,965 B1
(45) Date of Patent: Jun. 19, 2018

(54) PLAYBACK SYSTEM JOIN WITH BASE

(71) Applicant: Sonos, Inc., Santa Barbara, CA (US)

(72) Inventors: Jonathan P. Lang, Santa Barbara, CA (US); Christopher D. Butts, Chicago, IL (US)

(73) Assignee: Sonos, Inc., Santa Barbara, CA (US)

( * ) Notice: Subject to any disclaimer, the term of this patent is extended or adjusted under 35 U.S.C. 154(b) by 330 days.

(21) Appl. No.: 14/844,253

(22) Filed: Sep. 3, 2015

(51) Int. Cl.
| | |
|---|---|
| *G06F 15/16* | (2006.01) |
| *G06F 3/16* | (2006.01) |
| *H04R 27/00* | (2006.01) |
| *H04R 5/04* | (2006.01) |
| *H04L 12/24* | (2006.01) |

(52) U.S. Cl.
CPC .......... *G06F 3/165* (2013.01); *H04L 41/0893* (2013.01); *H04L 41/12* (2013.01); *H04R 5/04* (2013.01); *H04R 27/00* (2013.01); *H04R 2205/021* (2013.01); *H04R 2227/003* (2013.01); *H04R 2227/005* (2013.01)

(58) Field of Classification Search
CPC ..... G06F 3/165; H04L 41/0893; H04L 41/12; H04R 5/04; H04R 27/00; H04R 2227/005; H04R 2227/003; H04R 2205/021
See application file for complete search history.

(56) References Cited

U.S. PATENT DOCUMENTS

| | | | |
|---|---|---|---|
| 4,696,037 A | 9/1987 | Fierens | |
| 5,440,644 A | 8/1995 | Farinelli et al. | |
| 5,553,147 A | 9/1996 | Pineau | |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | Dilorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |

(Continued)

FOREIGN PATENT DOCUMENTS

| | | |
|---|---|---|
| EP | 1389853 A1 | 2/2004 |
| EP | 2180727 A2 | 4/2010 |

(Continued)

OTHER PUBLICATIONS

First Action Interview Office Action dated Oct. 16, 2015, issued in U.S. Appl. No. 14/631,713, filed Feb. 25, 2015, 5 pages.

(Continued)

*Primary Examiner* — Padma Mundur
(74) *Attorney, Agent, or Firm* — McDonnell Boehnen Hulbert & Berghoff LLP

(57) ABSTRACT

An example implementation may involve a playback device detecting placement of the playback device onto a device base of a particular media playback system. The playback device may determine that it is configured to automatically join media playback systems. Based on such a determination, the playback device may send, to the particular media playback system, a request to join the particular media playback system. The playback device may receive, from the media playback system, one or more messages that enable the playback device to join the particular media playback system, which the playback device may use to join the particular media playback system.

33 Claims, 12 Drawing Sheets

(56) References Cited

U.S. PATENT DOCUMENTS

| | | |
|---|---|---|
| 6,631,410 B1 | 10/2003 | Kowalski et al. |
| 6,757,517 B2 | 6/2004 | Chang |
| 6,778,869 B2 | 8/2004 | Champion |
| 6,809,635 B1 | 10/2004 | Kaaresoja |
| 6,882,335 B2 | 4/2005 | Saarinen |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,311,526 B2 | 12/2007 | Rohrbach et al. |
| 7,483,538 B2 | 1/2009 | McCarty et al. |
| 7,494,098 B1 | 2/2009 | Fulda |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,090,317 B2 | 1/2012 | Burge et al. |
| 8,103,009 B2 | 1/2012 | McCarty et al. |
| 8,214,447 B2 | 7/2012 | Deslippe et al. |
| 8,234,395 B2 | 7/2012 | Millington et al. |
| 8,326,951 B1 | 12/2012 | Millington et al. |
| 8,483,853 B1 | 7/2013 | Lambourne |
| 8,903,526 B2 | 12/2014 | Beckhardt et al. |
| 8,910,265 B2 | 12/2014 | Lang et al. |
| 8,995,240 B1 | 3/2015 | Van Erven et al. |
| 9,042,556 B2 | 5/2015 | Kallai et al. |
| 9,137,564 B2 | 9/2015 | Reimann |
| 9,213,762 B1 | 12/2015 | Erven et al. |
| 9,223,862 B2 | 12/2015 | Beckhardt |
| 9,226,072 B2 | 12/2015 | Bender et al. |
| 9,232,277 B2 | 1/2016 | Vega et al. |
| 9,247,492 B2 | 1/2016 | Millington et al. |
| 9,285,886 B2 | 3/2016 | Reilly et al. |
| 9,286,384 B2 | 3/2016 | Kuper et al. |
| 9,329,831 B1 | 5/2016 | Fullerton et al. |
| 9,330,096 B1 | 5/2016 | Fullerton et al. |
| 9,361,371 B2 | 6/2016 | Coburn et al. |
| 9,460,755 B2 | 10/2016 | Coburn |
| 9,501,533 B2 | 11/2016 | Coburn et al. |
| 9,554,201 B2 | 1/2017 | Williams et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0127812 A1 | 9/2002 | Matsunaga et al. |
| 2003/0157951 A1 | 8/2003 | Hasty |
| 2004/0024478 A1 | 2/2004 | Hans et al. |
| 2005/0201549 A1 | 9/2005 | Dedieu et al. |
| 2005/0286546 A1 | 12/2005 | Bassoli et al. |
| 2007/0003067 A1 | 1/2007 | Gierl et al. |
| 2007/0038999 A1 | 2/2007 | Millington et al. |
| 2007/0142944 A1 | 6/2007 | Goldberg et al. |
| 2007/0265031 A1 | 11/2007 | Koizumi et al. |
| 2008/0144864 A1 | 6/2008 | Huon |
| 2008/0146289 A1 | 6/2008 | Korneluk et al. |
| 2009/0164600 A1 | 6/2009 | Issa et al. |
| 2009/0217036 A1* | 8/2009 | Irwin ............... G06F 21/10 713/168 |
| 2011/0002487 A1 | 1/2011 | Panther et al. |
| 2012/0051567 A1 | 3/2012 | Castor-Perry |
| 2013/0129122 A1 | 5/2013 | Johnson et al. |
| 2013/0173034 A1 | 7/2013 | Reimann et al. |
| 2013/0248678 A1 | 9/2013 | Kramer |
| 2013/0316686 A1 | 11/2013 | Subbaramoo et al. |
| 2013/0346859 A1 | 12/2013 | Bates et al. |
| 2014/0006587 A1* | 1/2014 | Kusano ........... H04N 21/41407 709/224 |
| 2014/0181199 A1 | 6/2014 | Kumar et al. |
| 2014/0181654 A1 | 6/2014 | Kumar et al. |
| 2014/0195587 A1 | 7/2014 | Sukoff et al. |
| 2014/0230015 A1* | 8/2014 | Pollock ................ H04L 63/10 726/3 |
| 2014/0270284 A1 | 9/2014 | Luna |
| 2014/0323036 A1 | 10/2014 | Daley et al. |
| 2014/0331133 A1 | 11/2014 | Coburn, IV et al. |
| 2015/0091691 A1 | 4/2015 | Calatayud |
| 2015/0092947 A1 | 4/2015 | Gossain et al. |
| 2015/0100991 A1 | 4/2015 | Risberg et al. |
| 2015/0212788 A1 | 7/2015 | Lang |
| 2015/0237424 A1 | 8/2015 | Wilker et al. |
| 2015/0264509 A1 | 9/2015 | Oishi et al. |
| 2015/0278322 A1 | 10/2015 | Beckhardt |
| 2016/0011590 A1 | 1/2016 | Griffiths et al. |
| 2016/0011846 A1 | 1/2016 | Sheen |
| 2016/0011848 A1 | 1/2016 | Wilberding et al. |
| 2016/0011850 A1 | 1/2016 | Sheen et al. |
| 2016/0014512 A1 | 1/2016 | Wilberding et al. |
| 2016/0014535 A1 | 1/2016 | Wilberding et al. |
| 2016/0014536 A1 | 1/2016 | Sheen |
| 2016/0062606 A1 | 3/2016 | Vega et al. |
| 2016/0162252 A1 | 6/2016 | Di Censo et al. |

FOREIGN PATENT DOCUMENTS

| | | |
|---|---|---|
| WO | 200153994 | 7/2001 |
| WO | 2003093950 A2 | 11/2003 |

OTHER PUBLICATIONS

First Action Interview Office Action dated Oct. 23, 2015, issued in U.S. Appl. No. 14/631,723, filed Feb. 25, 2015, 5 pages.

Horwitz, Jeremy, "Logic3 i-Station25," retrieved from the internet: http://www.ilounge.com/index.php/reviews/entry/logic3-i-station25/, last visited Dec. 17, 2013, 5 pages.

International Bureau, International Preliminary Report on Patentability dated Jan. 30, 2014, issued in connection with International Application No. PCT/US2012/045894, filed on Jul. 9, 2012, 6 pages.

International Search Authority, International Search Report and Written Opinion dated Oct. 18, 2016, issued in connection with International Application No. PCT/US2016/042822, filed on Jul. 18, 2016, 13 pages.

International Searching Authority, International Search Report and Written Opinion dated May 25, 2016, issued in connection with International Application No. PCT/US2016/019325, filed on Feb. 24, 2016, 11 pages.

International Searching Authority, International Search Report dated Dec. 26, 2012, issued in connection with International Application No. PCT/US2012/045894, filed on Jul. 9, 2012, 3 pages.

International Searching Authority, Written Opinion dated Dec. 26, 2012, issued in connection with International Application No. PCT/US2012/045894, filed on Jul. 9, 2012, 4 pages.

"Denon 2003-2004 Product Catalog," Denon, 2003-2004, 44 pages.

Non-Final Office Action dated Feb. 1, 2016, issued in connection with U.S. Appl. No. 14/337,536, filed Jul. 22, 2014, 9 pages.

Non-Final Office action dated Nov. 15, 2016, issued in connection with U.S. Appl. No. 15/078,300, filed Mar. 23, 2016, 8 pages.

Notice of Allowance dated Aug. 1, 2016, issued in connection with U.S. Appl. No. 14/337,536, filed Jul. 22, 2014, 9 pages.

Notice of Allowance dated Nov. 16, 2016, issued in connection with U.S. Appl. No. 14/803,094, filed Jul. 19, 2015, 7 pages.

Notice of Allowance dated Jan. 28, 2016, issued in U.S. Appl. No. 14/631,713, filed Feb. 25, 2015,6 pages.

Notice of Allowance dated Jan. 28, 2016, issued in U.S. Appl. No. 14/631,723, filed Feb. 25, 2015, 6 pages.

Preinterview First Office Action dated Sep. 23, 2016, issued in connection with U.S. Appl. No. 14/803,094, filed Jul. 19, 2015, 5 pages.

Roland Corporation, "Roland announces BA-55 Portable PA System," press release, Apr. 6, 2011, 2 pages.

United States Patent and Trademark Office, U.S. Appl. No. 60/490,768, filed Jul. 28, 2003, entitled "Method for synchronizing audio playback between multiple networked devices," 13 pages.

(56) References Cited

OTHER PUBLICATIONS

United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
U.S. Appl. No. 14/803,094, entitled "Base Properties in a Media Playback System" filed Jul. 19, 2015.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide" Jun. 2000, 70 pages.
Dell, Inc. "Start Here" Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3" TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture"; Jun. 8, 2000; version 1.0; Microsoft Corporation; pp. 1-54.
Advisory Action dated Jul. 13, 2017, issued in connection with U.S. Appl. No. 15/078,300, filed Mar. 23, 2016, 3 pages.
Final Office Action dated May 1, 2017, issued in connection with U.S. Appl. No. 15/078,300, filed Mar. 23, 2016, 13 pages.
Notice of Allowance dated Jul. 19, 2017, issued in connection with U.S. Appl. No. 15/338,785, filed Oct. 31, 2016, 10 pages.
Notice of Allowance dated Jun. 21, 2017, issued in connection with U.S. Appl. No. 15/357,548, filed Nov. 21, 2016, 7 pages.

* cited by examiner

PLAYBACK SYSTEM JOIN WITH BASE

CROSS REFERENCE TO RELATED APPLICATIONS

This application is related to U.S. patent application Ser. No. 14/803,094 filed Jul. 19, 2015, entitled "Base Properties in a Media Playback System," which is incorporated herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different tracks can be streamed to each room with a playback device, rooms can be grouped together for synchronous playback, or the same track can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
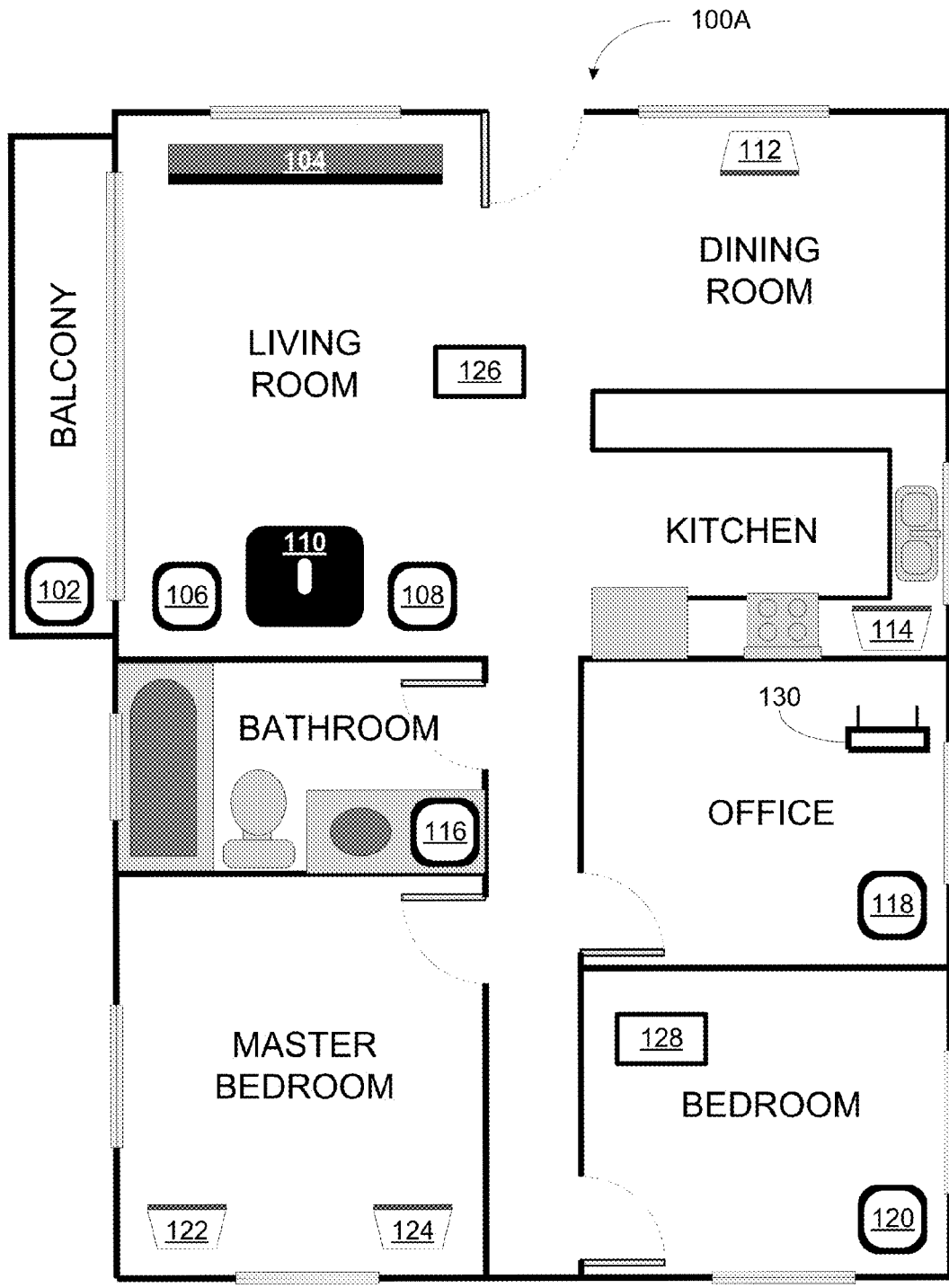
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, inter alia, causing a playback device joining a media playback system upon being placed upon a device base that is associated with the media playback system. An example media playback may include one or more devices that are interconnected with one another to operate as a system. By joining a media playback system, a playback device may become associated with one or more second devices of the media playback system. Further, the playback device may adopt a name and network parameters that allow the playback device to interconnect and communicate with the one or more second devices.

Some media playback systems may include at least one of two or more types of devices. For instance, an example media playback system may include one or more playback devices that play back media and perhaps also one or more control devices that include respective control interfaces to control playback by the one or more playback devices. A certain set of such devices may be associated with one another as a media playback system such that the control device(s) are configured to control playback by the playback device(s).

A media playback system may be referred to as a household, as an example system may include one or more playback devices in different rooms of a home (e.g., a house or apartment) or other building (e.g., an office). The media playback system may include one or more zones that include one or more respective playback devices. Each zone may correspond to a respective room or area of the household. Upon being placed on a particular device base of the media playback system, a playback device may join a given zone of the media playback system that is associated with that particular device base.

In practice, a playback device may detect that it is placed onto a device base. The playback device may identify the device base as a particular device base, which may in turn identify the media playback system that is associated with the particular device base. In some cases, the playback device may identify the device base by way of a signal or message received from the device base.

After identifying the device base, the playback device may send a request to join the media playback system that is associated with the particular device base. In response to the request, the playback device may receive a message that enables the playback device to join the particular media playback system. The message may include system configuration and/or network parameters that allow the playback device to interconnect and communicate with the media playback system. Upon receiving such a message, the playback device may automatically join the media playback system by adopting the system configuration and network parameters.

Some example playback devices might automatically join a media playback system upon being placed on a device base when configured to do so (and perhaps might not join the media playback system when configured not to do so). For example, a playback device may include a tangible data storage that includes a configuration of the playback device. Such a configuration may govern behavior of the playback device in certain situations, such as whether the playback device automatically joins a media playback system upon being placed on a device base that is associated with the media playback system. In some cases, the configuration may be explicit (e.g., a setting is set to enable the playback device to automatically join media playback systems (or one or more particular media playback systems)). Alternatively, the configuration could be implicit. For instance, the playback device might be configured to join media playback systems when not be currently part of a media playback system, in factory reset mode, or in a portable mode (e.g., battery-powered), among other possible states.

According to some example configurations, the playback device may join the media playback system on a limited basis when automatically joining based on placement on a device base. A playback device that has joined in such a manner may be referred to as a guest device. A guest device may have limited access to a media playback system, as compared with other playback devices that have joined the media playback system using other techniques, such as explicit configuration). For instance, upon being placed on the device base, a playback device may join a media playback system for a limited period of time or a limited number of media item plays. After expiration of this period, the playback device may automatically leave the media playback system. Further, the playback device may have limited access to other devices of the media playback system or to services with which the media playback system is registered.

In some embodiments, a device base of a media playback system may include a controller that facilities a playback device joining the media playback system when the playback device is placed upon a base of the device base. The device base may detect placement of the playback device onto its base, and responsively perform operations to join the playback device to its media playback system. Such operations may include requesting that the playback device join the media playback system or providing an identifier of the device base to the playback device, perhaps to facilitate the playback device requesting that the playback device join the media playback system. The operations might also include providing configuration information that enables the playback device to join the media playback system, among other possible operations.

Some playback devices may have favorites assigned to the playback device. Such favorites may be accessible through a control interface (e.g., buttons) on the playback device itself and/or through a control interface on a control device. For instance, an example control device may include five favorite buttons. Selection of a particular favorite button may cause the playback device to begin playing back a particular media source (e.g., a track, album, playlist, or internet radio station). In some cases, the favorites assigned to a given playback device may have been configured when the playback device was joined to a first media playback system. Upon being placed on a device base that is associated with a second media playback system, the playback device may automatically join the second media playback system.

However, the second media playback system might not have access to the same media as the first media playback device. To retain access to the favorite, the playback device may cross-link the favorite media from the first system with media that the second system has access. For instance, a favorite might be linked to a playlist of media items from a first media service (e.g., Spotify®). If the second system is not registered with the first media service, the playback device may search for versions of the media items from one or more second services (e.g., Apple Music® or Tidal®). In this way, the favorite may continue to link to the same playlist of media items when the playback device is part of the second media playback system, albeit from one or more different sources.

As indicated above, example techniques may involve a playback device joining a media playback system when placed upon a device base. In one aspect, a method is provided. The method may involve detecting placement of the playback device onto a device base of a particular media playback system. The method may further involve determining that the playback device is configured to automatically join media playback systems. The method may also involve sending, to the particular media playback system, a request to join the particular media playback system based on determining that the playback device is configured to automatically join media playback systems. The method may further involve receiving, from the media playback system, one or more messages that enable the playback device to join the particular media playback system.

In another aspect, a device is provided. The device includes one or more processors; and a data storage having stored therein instructions executable by the one or more processors to cause the playback device to perform operations. The operations may include detecting placement of the playback device onto a device base of a particular media playback system. The operations may further include determining that the playback device is configured to automatically join media playback systems. The operations may also include sending, to the particular media playback system, a request to join the particular media playback system based on determining that the playback device is configured to automatically join media playback systems. The operations may further include receiving, from the media playback system, one or more messages that enable the playback device to join the particular media playback system.

In yet another aspect, a non-transitory computer readable memory is provided. The non-transitory computer readable memory has stored thereon instructions executable by a computing device to cause the computing device to perform operations. The operations may include detecting placement of the playback device onto a device base of a particular media playback system. The operations may further include determining that the playback device is configured to automatically join media playback systems. The operations may also include sending, to the particular media playback system, a request to join the particular media playback system based on determining that the playback device is configured to automatically join media playback systems. The operations may further include receiving, from the media playback system, one or more messages that enable the playback device to join the particular media playback system.

Example techniques may involve a device base facilitating a playback device joining a media playback system when the playback device is placed upon the device base. In one aspect, a method is provided. The method may involve detecting placement of a playback device onto the base. The method may also involve, responsively, listening for a request to join media playback systems. The method may further involve sending, to a media playback system that is associated with the device base, a request to join the playback device to the media playback system upon receiving the request to join media playback systems from the playback device. The method may additionally involve receiving, from the media playback system, a message indicating that the playback device is permitted to join the media playback system, and responsively, sending a message that enables the playback device to join the media playback system.

In another aspect, a device base is provided. The device base includes one or more processors; and a data storage having stored therein instructions executable by the one or more processors to cause the device base to perform operations. The operations may include detecting placement of a playback device onto the base. The operations may also include, responsively, listening for a request to join media playback systems. The operations may further include sending, to a media playback system that is associated with the device base, a request to join the playback device to the media playback system upon receiving the request to join media playback systems from the playback device. The operations may additionally include receiving, from the media playback system, a message indicating that the playback device is permitted to join the media playback system, and responsively, sending a message that enables the playback device to join the media playback system.

In yet another aspect, a non-transitory computer readable memory is provided. The non-transitory computer readable memory has stored thereon instructions executable by a device base to cause the device base to perform operations. The operations may include detecting placement of a playback device onto the base. The operations may also include, responsively, listening for a request to join media playback systems. The operations may further include sending, to a media playback system that is associated with the device base, a request to join the playback device to the media playback system upon receiving the request to join media playback systems from the playback device. The operations may additionally include receiving, from the media playback system, a message indicating that the playback device is permitted to join the media playback system, and responsively, sending a message that enables the playback device to join the media playback system.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100A in which one or more embodiments disclosed herein may be practiced or implemented. The media playback system 100A as shown is associated with an example home environment having several rooms and spaces, such as for example, a master bedroom, an office, a dining room, and a living room. As shown in the example of FIG. 1, the media playback system 100A includes playback devices 102-124, control devices 126 and 128, and a wired or wireless network router 130.

Further discussions relating to the different components of the example media playback system 100A and how the different components may interact to provide a user with a media experience may be found in the following sections. While discussions herein may generally refer to the example media playback system 100A, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
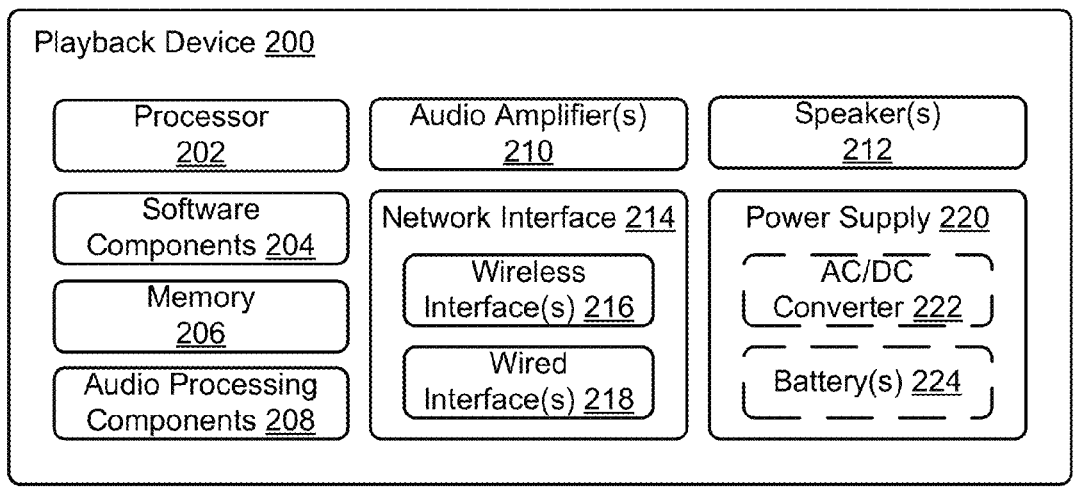
FIG. 2 shows a functional block diagram of an example playback device.

FIG. 2 shows a functional block diagram of an example playback device 200 that may be configured to be one or more of the playback devices 102-124 of the media playback system 100A of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and a power supply 220, which may include an AC/DC converter 222 and/or one or more batteries 224.

In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The power supply 220 may supply current to the various other components of the playback device 200. The power supply 220 may include an AC/DC converter 222, which may convert supplied alternating current to direct current used by the component of playback device 220. In some cases, playback 220 may include one or more batteries 224, which may store charge that the playback device 200 draws during portable operation.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100A of FIG. 1, the environment may have one or more playback zones, each with one or more playback devices. The media playback system 100A may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100A may be dynamically modified, and in some embodiments, the media playback system 100A supports numerous configurations. For instance, if a user physically moves one or more playback devices to or from a zone, the media playback system 100A may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already configured with a playback zone, a new playback zone may be created for the particular area.

Further, different playback zones of the media playback system 100A may be dynamically combined into zone groups or split up into individual playback zones. For instance, the Dining Room zone and the Kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
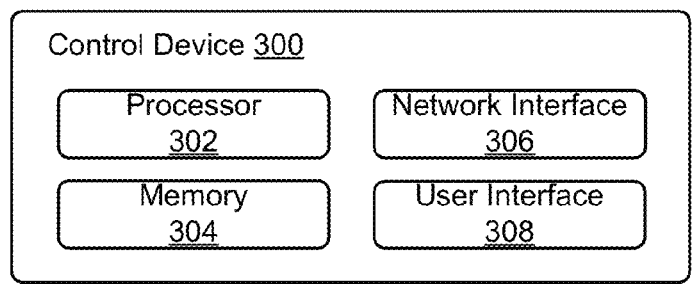
FIG. 3 shows a functional block diagram of an example control device.

FIG. 3 shows a functional block diagram of an example control device 300 that may be configured to be one or both of the control devices 126 and 128 of the media playback system 100A. Control device 300 may also be referred to as a controller 300. As shown, the control device 300 may include a processor 302, memory 304, a network interface 306, and a user interface 308. In one example, the control device 300 may be a dedicated controller for the media playback system 100A. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100A. The memory 304 may be configured to store instructions executable by the processor 302 to perform those functions. The memory 304 may also be configured to store the media playback system controller application software and other data associated with the media playback system 100A and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100A. In one example, data and information (e.g., such as a state variable) may be communicated between control device 300 and other devices via the network interface 306. For instance, playback zone and zone group configurations in the media playback system 100A may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100A may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
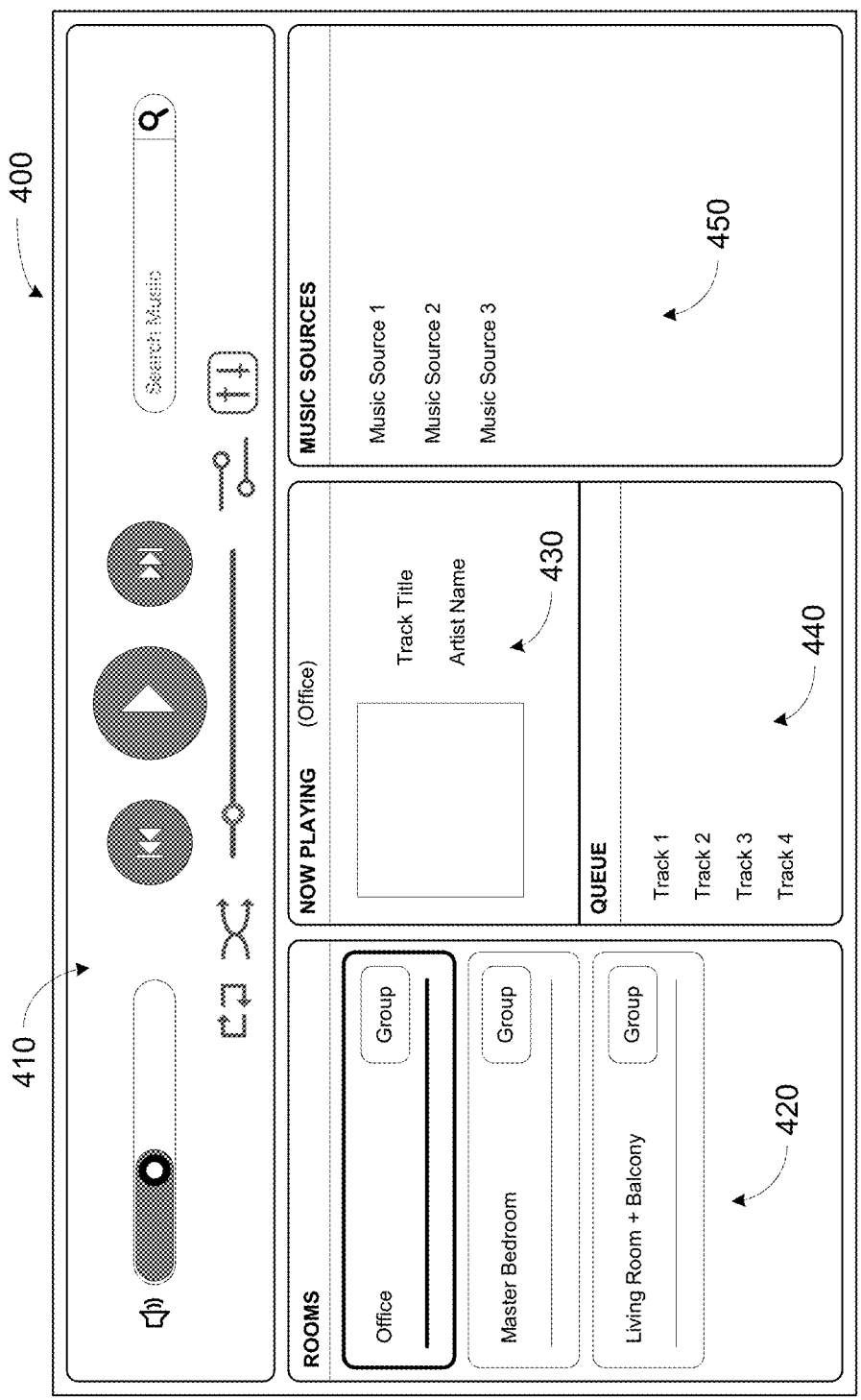
FIG. 4 shows an example controller interface.

The user interface 308 of the control device 300 may be configured to facilitate user access and control of the media playback system 100A, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100A. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100A. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100A of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100A of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Device Base

Figure 5:
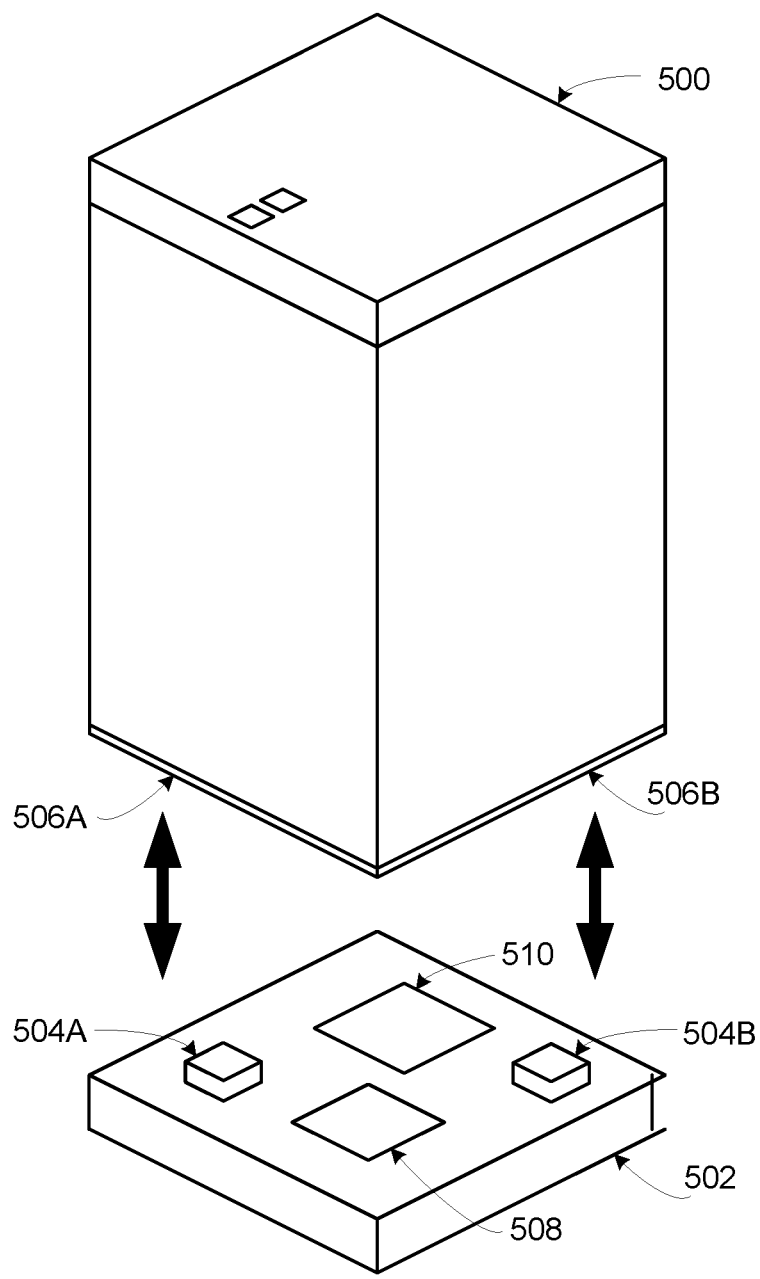
FIG. 5 shows an example playback device and an example device base.

FIG. 5 shows an example playback device 500 and an example device base 502. As shown, playback device 500 may be placed onto device base 502. Protrusions 504A and 504B may align with recesses 506A and 508B on the playback device. Such protrusions and recesses may facilitate placing the playback device 500 on the device 502 and may improve stability of the playback device while it is positioned on the device base 502.

Some device bases may include device charging systems. For instance, device base 502 includes charging system 508. When a playback device, such as playback device 500, is placed on device base 502, the playback device may draw current from charging system 508 to charge one or more of its batteries. In some embodiments, charging system 508 may include an inductive charging circuit (e.g., a coil that induces a current in a corresponding coil in the playback device that wirelessly charges one or more batteries of the playback device). Alternatively, charging system 508 may include conductive terminals by which playback device 500 may draw current from the device base 502.

In some embodiments, a device base may carry an identifier that distinguishes that device base from at least some other device bases (e.g., other device bases of a given media playback system, or perhaps other devices bases more broadly). In some implementations, the device base may passively communicate this identifier to a playback device that is placed upon the device base. For instance, a charging circuit may include a current or voltage signature (i.e., a pattern) that is unique as compared to other device bases. A playback device may use this unique signature to identify the charging base. Alternatively, a charging circuit may superimpose a signal onto the current delivered from the device base (e.g., current from the device base may include a higher frequency signal carrying the identifier of the device base). In further examples, a device base may include an RFID tag, QR code, or other identifying component that is read by the playback device when the playback device is placed upon the device base.

In some implementations, a device base includes a control system. For example, device base 502 includes control system 510. Control system 510 includes one or more processors and a memory. The processor(s) may be clock-driven computing components that process input data according to instructions stored in the memory. The memory may be a tangible computer-readable medium configured to store instructions executable by the processor(s) to cause the device base to carry out operations. Example operations include communicating via a communications interface (e.g., a BLUETOOTH® interface) with playback device 500 and causing charging system 508 to supply current to playback device 500, among other examples.

Figure 6:
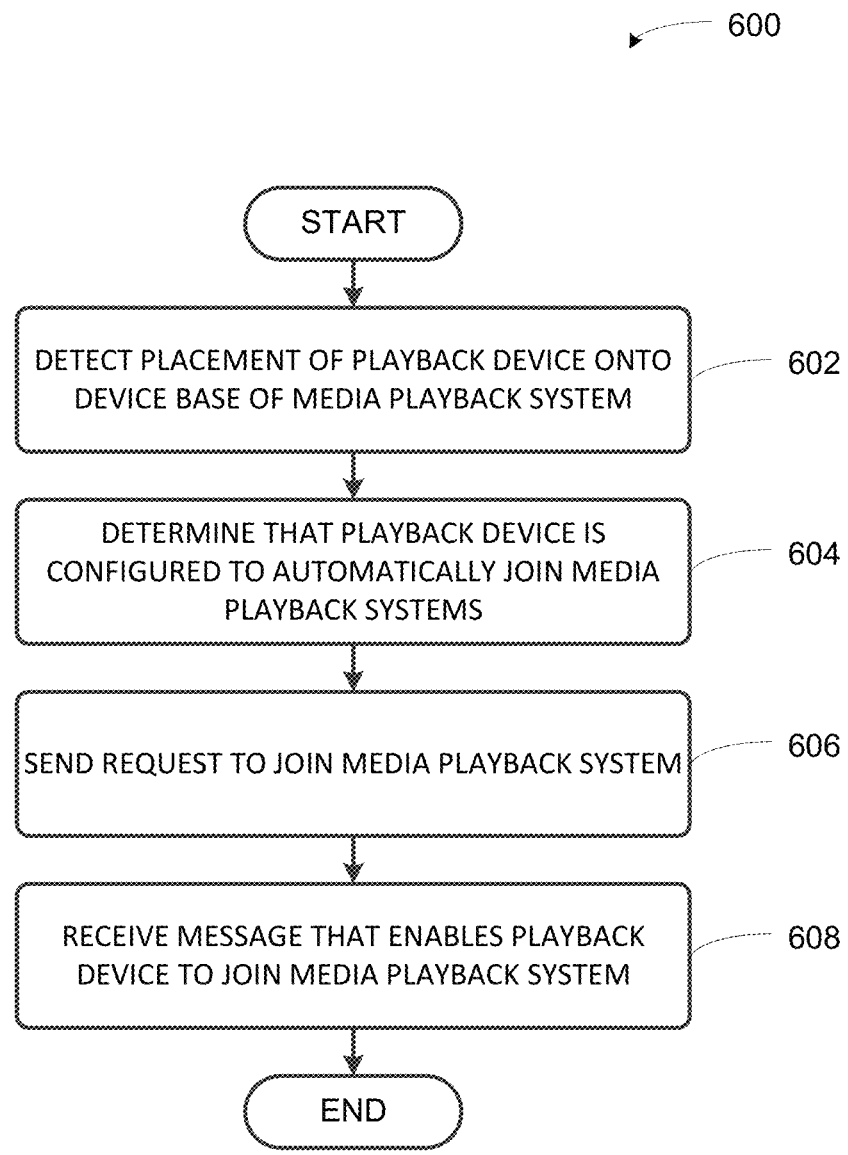
FIG. 6 shows an example flow diagram to facilitate a playback device joining a media playback system, according to an example embodiment.
Figure 10:
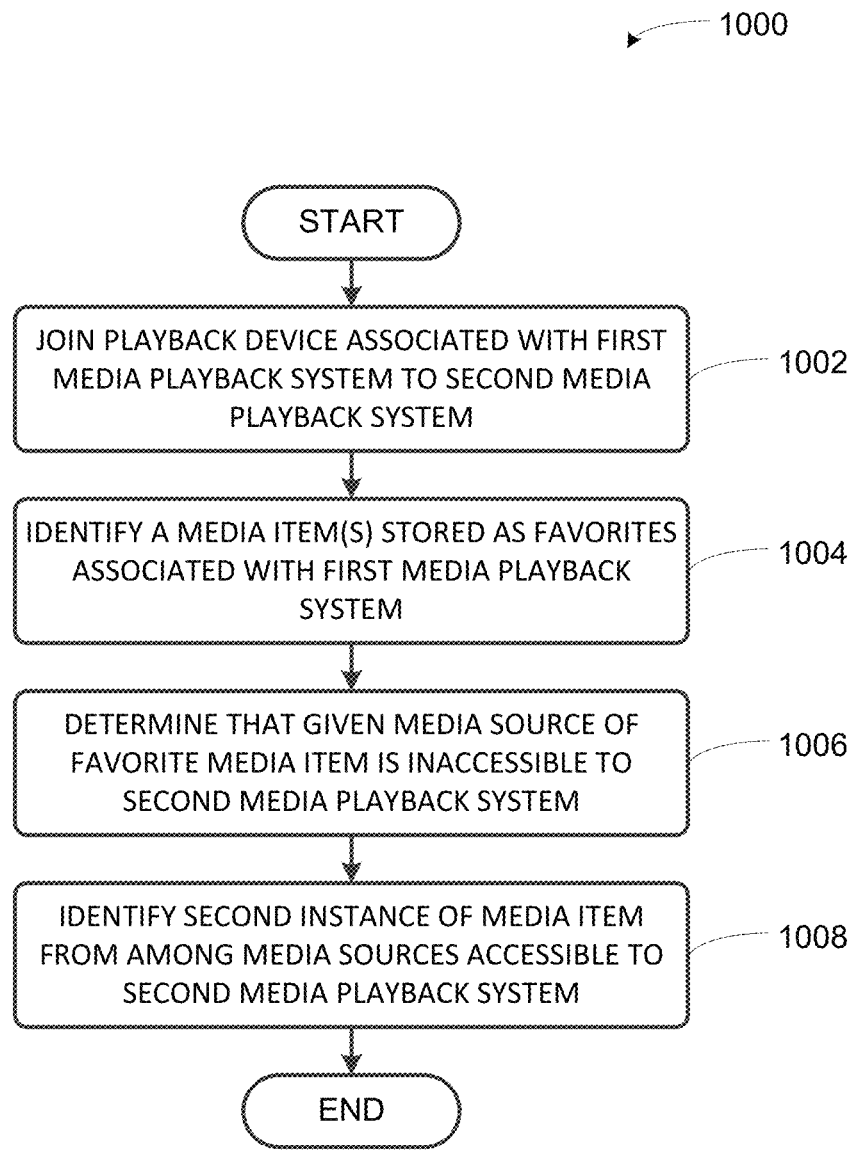
FIG. 10 shows an example flow diagram to facilitate transfer of favorites between media playback systems, according to an example embodiment.
Figure 13:
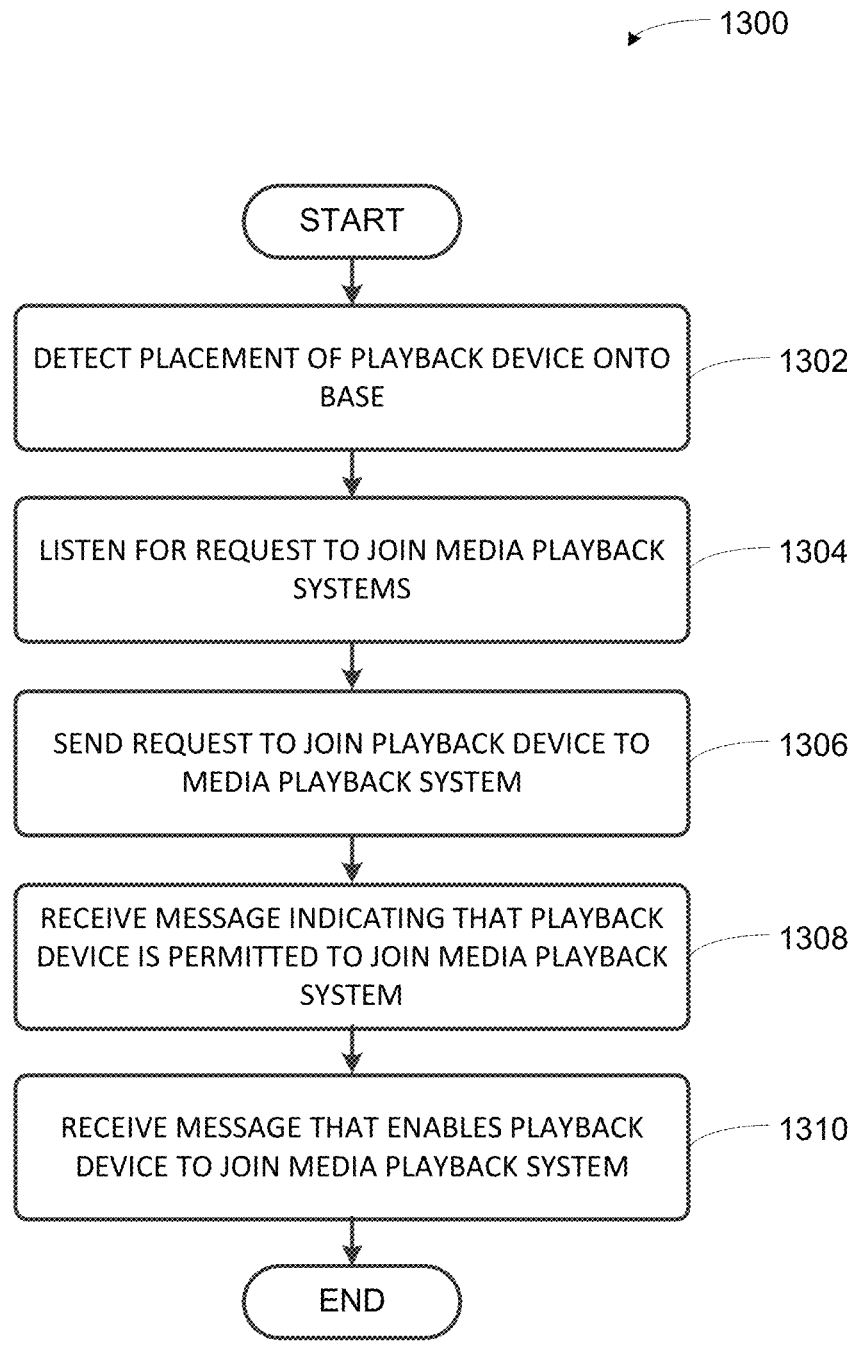
FIG. 13 shows another example flow diagram to facilitate a playback device joining a media playback system, according to an example embodiment.

Moving now to several example implementations, implementations 600, 1000, and 1300 shown in FIGS. 6, 10, and 13, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementations 600, 1000, and 1300 may include one or more operations, functions, or actions as illustrated by one or more of blocks shown in FIGS. 6, 10, and 13. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Techniques to Join a Playback Device to a Device Base

As discussed above, embodiments described herein may facilitate a playback device joining a media playback system when placed onto a device base. FIG. 6 illustrates an example implementation 600 by which a playback device joins a media playback system when placed upon a device base that is associated with the device base.

a. Detect Placement of a Playback Device onto a Device Base of a Media Playback System At block 602, implementation 600 involves detecting placement of the playback device on a device base. For instance, referring to FIG. 5, playback device 500 may detect that it has been placed onto device base 502. Device base 502 may be associated with a particular media playback system (e.g., media playback system 100 of FIG. 1).

In some embodiments, a playback device may detect placement onto a device base by way of a physical trigger. For instance, a device base may be designed to trigger a switch or other mechanism of the device base when a playback device is placed upon the device base. In such cases, by detecting triggering of the switch or mechanism, the playback device detects placement onto the device base. As another example, a playback device may detect placement onto a device base upon receiving current from the device base (such when charging a battery of the playback device from a device base).

Alternatively, a playback device may detect placement onto a device base by way of a radio signal between the playback device and the device base. For instance, the playback device and the device base may include respective radio interfaces (e.g., near-field wireless communications interfaces such as NFC (near field communications) or BLUETOOTH® LE). A playback device may detect placement onto a device base upon receiving a message from the device base.

The message may include an identifier of the device base. The playback device may use the identifier to identify the media playback system that the device base is associated with (i.e., that the device base is associated with a particular media playback system). In some embodiments, a playback device may identify the device base by way of an identifier that uniquely identifies a particular base among devices of a media playback system (and possibly among all device bases from a particular manufacturer). In some implementations, each device base has such an identifier, which may be communicated to a playback device when that playback device is placed on the base. Within examples, the identifier may be stored in a data storage of the device base (e.g., a memory of control system 510 of device base 502), or the identifier may be coded into the device base (e.g., by way of a DIP switch or other logical circuitry). While several example techniques for identifying a device base are noted, other techniques for identifying a device base are contemplated as well, such as an RFID tag or QR code.

To illustrate, while playback device 500 is placed on device base 502, control system 510 may cause a radio interface to periodically transmit the identifier of device base 502 to a corresponding radio interface of playback device 500. As noted above, a device base may use a near-field wireless communications interface, which may have a limited range such that the playback device is in range of the device base when the playback device is placed on or nearby the device base. Shielding the antenna of such a communications interface may further limit and orient its communications range, which may prevent communications between a playback device and a device base when the playback device is not on the device base such that successful communication between the playback device and device base indicates that the playback device is placed upon the device base.

In other examples, a signal may be communicated to the playback device via the charging circuit of the device base. For instance, a charging circuit may include a current or voltage signature (i.e., a pattern) that is unique as compared to other device bases. A playback device may use this unique signature to identify the charging base. Alternatively, a charging circuit may superimpose a communications signal onto the current delivered from the device base (e.g., current from the device base may include a higher frequency communications signal carrying the identifier).

Figure 7:
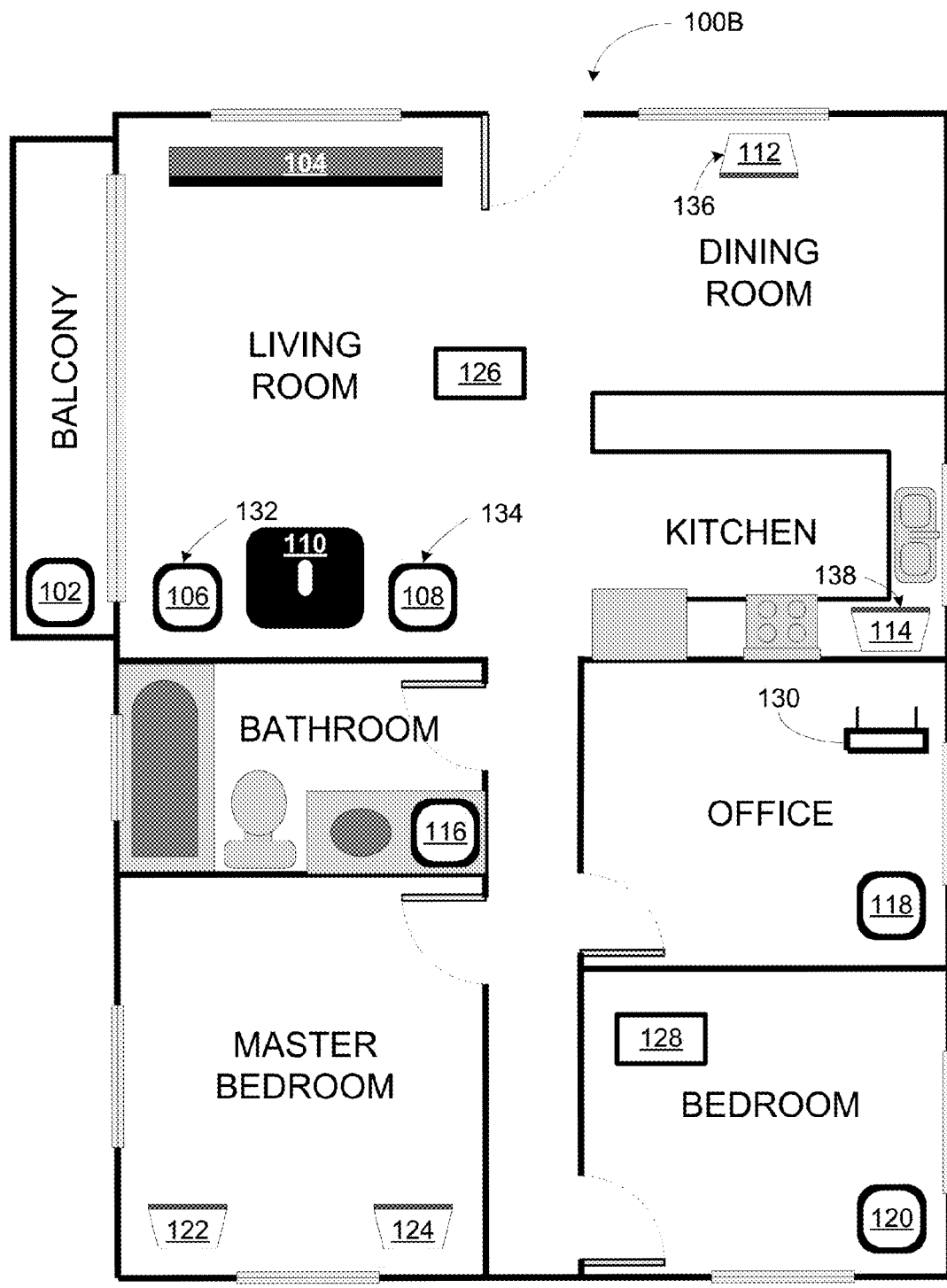
FIG. 7 shows another example media playback system configuration in which certain embodiments may be practiced.

FIG. 7 illustrates example media playback system 100B, which is another example configuration of media playback system 100A. As shown in FIG. 7, media playback system 100B includes device bases 132, 134, 136, and 138. Playback devices 106, 108, 112, and 114 are placed on device bases 132, 134, 136, and 138 respectively. When playback devices 106 and 108 are placed upon respective device bases (e.g., device base 132 and 134), playback devices 106 and 108 may detect that they are placed upon those device bases (i.e., device base 132 and 134) and perhaps also identify those device bases. Likewise, when playback device 112 is placed on a device base (e.g., device base 136), playback device 112 may identify that device base. In another example, playback device 112 may be placed on device base 138 (after playback device 114 is removed) and identify that device base.

b. Determine that the Playback Device is Configured to Automatically Join Media Playback Systems Referring back to FIG. 6, at block 604, implementation 600 involves determining that the playback device is configured to automatically join media playback systems. For instance, after detecting placement onto device base 502, playback device 500 may determine whether playback device 500 is configured to automatically join the media playback systems when placed upon a device base. As noted above, some example playback devices might not automatically join a media playback system upon being placed on a device base unless configured to do so. The configuration may be explicit (e.g., a setting is set to configure the playback device to automatically join media playback systems (or one or more particular media playback systems)). Alternatively, the configuration could be implicit. For example, a device might be configured to join media playback systems when not be currently part of a media playback system, when in a factory reset mode, or when in a portable mode (e.g., battery-powered), among other possible modes.

A configuration of a playback device may govern or influence whether the playback device is configured to automatically join media playback systems. Such a configuration may be stored in tangible data storage of the playback device. For instance, in FIG. 2, playback device 200 includes a memory, which may store a configuration of playback device 200. Such a configuration may govern behavior of the playback device in certain situations, such as whether the playback device automatically joins a media playback system upon being placed on a device base that is associated with the media playback system. In some cases, such a configuration may permit a playback device to automatically join any media playback system. Alternatively, the configuration may restrict the playback device to automatically join one or more particular media playback systems (e.g., one or more media playback systems having particular names or identifiers).

Changes to this configuration may be made by a control device that is connected to the playback devices, or in some implementations, using a control interface of the playback device. As described above in connection to FIG. 3, a control device may include a control interface that includes various controls that control operation of a playback device, which may include changes to the configuration of a playback device.

Whether a given playback device is configured to automatically join the media playback systems may depend upon whether the playback is currently joined to another media playback system. If a playback device is currently joined to a first media playback system, the device may be configured not to automatically join a second media playback system when placed upon a playback device that is associated with the second media playback system. However, if a playback device is not currently joined to any media playback system, the device may be configured to automatically join a media playback system when placed upon a playback device that is associated with that media playback system. A playback device may leave a media playback system when explicitly configured to do so (e.g., by way of a control interface) or when disconnected from the media playback system (e.g., the playback device is disconnected from the other devices of the system). Further, a new playback device, or a device in factory reset mode, might not be connected to any media playback system such that it is configured to automatically join media playback systems.

Some media playback systems may require a password, an authentication token, or other security mechanism from the playback device to automatically join the media playback system. A password or authentication token that authenticates a playback device to join a particular media playback system may be stored on a playback device such that when the playback device is placed on a device base of that system, the pre-stored password or token authenticates the playback device to join the system. Alternatively, such In some embodiments, a configuration of a given playback device may be stored as one or more state variables that are stored in a data storage that is maintained on another device or system that is accessible to the playback device. For instance, in some cases, the media playback system itself may store the state variables, perhaps in data storage of one or more playback device(s) or control device(s) of a media playback system, perhaps within a database. Alternatively, a remote server (e.g., a server that provides a cloud service) may store the state variables. Other examples are possible as well.

In some embodiments, the state variable(s) may be stored concurrently on multiple devices (e.g., on multiple devices within the media playback system), which may provide various advantages, such as redundancy and quicker access, among others. For instance, updates to the state variables stored on one playback device may be transmitted to other devices within the media playback system, so as to maintain an up-to-date instance of the state variables on multiple devices. In such cases, to determine whether a particular base is assigned a zone property that is associated with a given zone of a media playback system, a playback device may request (and receive) a state variable from one (or more) playback devices of the media playback system, perhaps by way of its network interface.

c. Send a Request to Join the Media Playback System

In FIG. 6, at block 606, implementation 600 involves sending a request to join the media playback system. For example, playback device 500 may send a request to join the particular media playback system to which device base 502 is associated. In some embodiments, playback device 500 may send such a request automatically, perhaps in response to detecting placement upon device base 502 or in response to determining that playback device 500 is configured to automatically join media playback systems.

In some implementations, the playback device may broadcast the request to join the media playback system such that devices of the media playback system may receive the request. The playback device may send the broadcast according to a particular protocol, such as SONOS® Netstart or APPLE® Wireless Accessory Configuration (WAC). In operation, devices of a media playback system may listen for messages conforming to such a protocol. Further, such protocols may permit the playback device to communicate with the devices of the media playback system without being connected to the network that interconnects the devices.

In other implementations, a playback device may send the request to join the media playback system to a particular device, or group of devices, that will facilitate the playback device joining the media playback system. For instance, the playback device may send a request to the device base, which may cause the device base to send (or request another device to send) configuration information and/or network parameters to the playback device. In further example, the playback device may send the request to control devices of the media playback system, which may facilitate the playback device joining the media playback system. In yet further examples, the playback device may send the request to playback devices of the media playback system, which may facilitate the playback device joining the media playback system.

Figure 8:
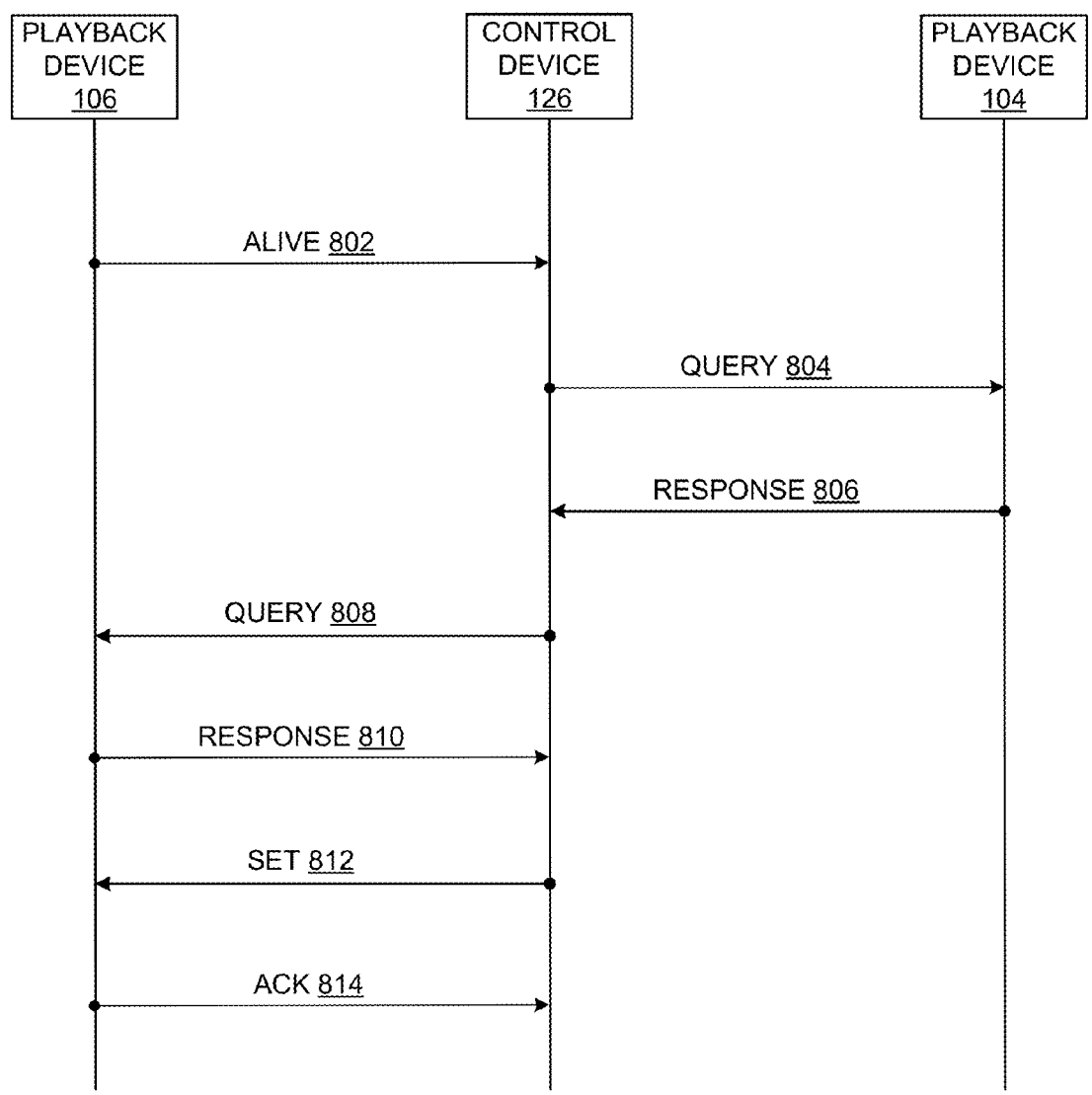
FIG. 8 illustrates an example message flow between devices, according to an example embodiment.

To illustrate an example request, FIG. 8 depicts an example message flow in which playback device 106 of FIG. 7 is placed upon device base 132 to join playback device 106 to media playback system 100B. In this example implementation, playback device 106 broadcasts an ALIVE 802 message, which indicates a request to join media playback system 100B. ALIVE 802 message is received by control device 126. Control device 126 may listen for ALIVE messages when in a particular mode (e.g., a set-up mode) or generally during operation. In an effort to transmit a request to join media playback system 100B (i.e., the ALIVE message), playback device 106 may repeatedly broadcast the ALIVE message for a period of time. Further, the playback device may transmit the ALIVE message at different frequencies (e.g., 2.4 Ghz and 5 Ghz), so as to communicate with devices that might be listening on a particular frequency.

Once control device 126 receives the ALIVE 802 message, it responds by sending a QUERY 804 message to another playback device of media playback system 100 (i.e., playback device 104). One purpose of the QUERY 804 message is to determine whether a media playback system has already been established. If no response is received to such a message, a control device may establish a new media playback system that includes the control device and the playback device that transmitted the ALIVE message.

After receiving the QUERY 804 message, playback device 104 sends a RESPONSE 806 message back to controller 126. The RESPONSE 806 message contains the name of media playback system 100B and the network parameters (e.g., SSID, frequency, channel, etc) of the network that interconnects the devices of media playback system 100B. Based on receiving the RESPONSE 806 message, control device 126 may determine that media playback system 100B exists and operate accordingly.

In particular, control device 126 may engage in a key exchange with playback device 106 (via QUERY 808 and a RESPONSE 810 message). After the key exchange, control device 126 provides the configuration and network parameters of media playback system 100B to playback device 106 in SET 812 message. Playback device 106 may acknowledge this message with an ACK 814 message to playback device 106.

While FIG. 8 presents an example implementation of a request to join a media playback system, other implementations are possible. For instance, a playback device that is joining a media playback system may communicate directly with a playback device of that media playback system, rather than through a control device, as described in FIG. 8. Or, as another example, a different message flow may occur, such as a message flow associated with another protocol (e.g., the WAC protocol). Yet further, a playback device may transmit a request to join the media playback system to the device base.

As noted above, in some cases, a media playback system may require confirmation before permitting the playback device to join the media playback system. A device of the media playback system may implement such authorization. For instance, prior to providing configuration and network parameters to a playback device, a control device may determine whether the playback device is authorized. In some cases, this authorization may involve checking a password or authorization token provided by the playback device. In other cases, this authorization may involve displaying a prompt that requests confirmation that the playback device should be added to the network. In some cases, the control device may obtain confirmation more generally by way of a configured setting (e.g., a setting to allow (or prohibit) automatic joining of docked playback devices).

Figure 9:
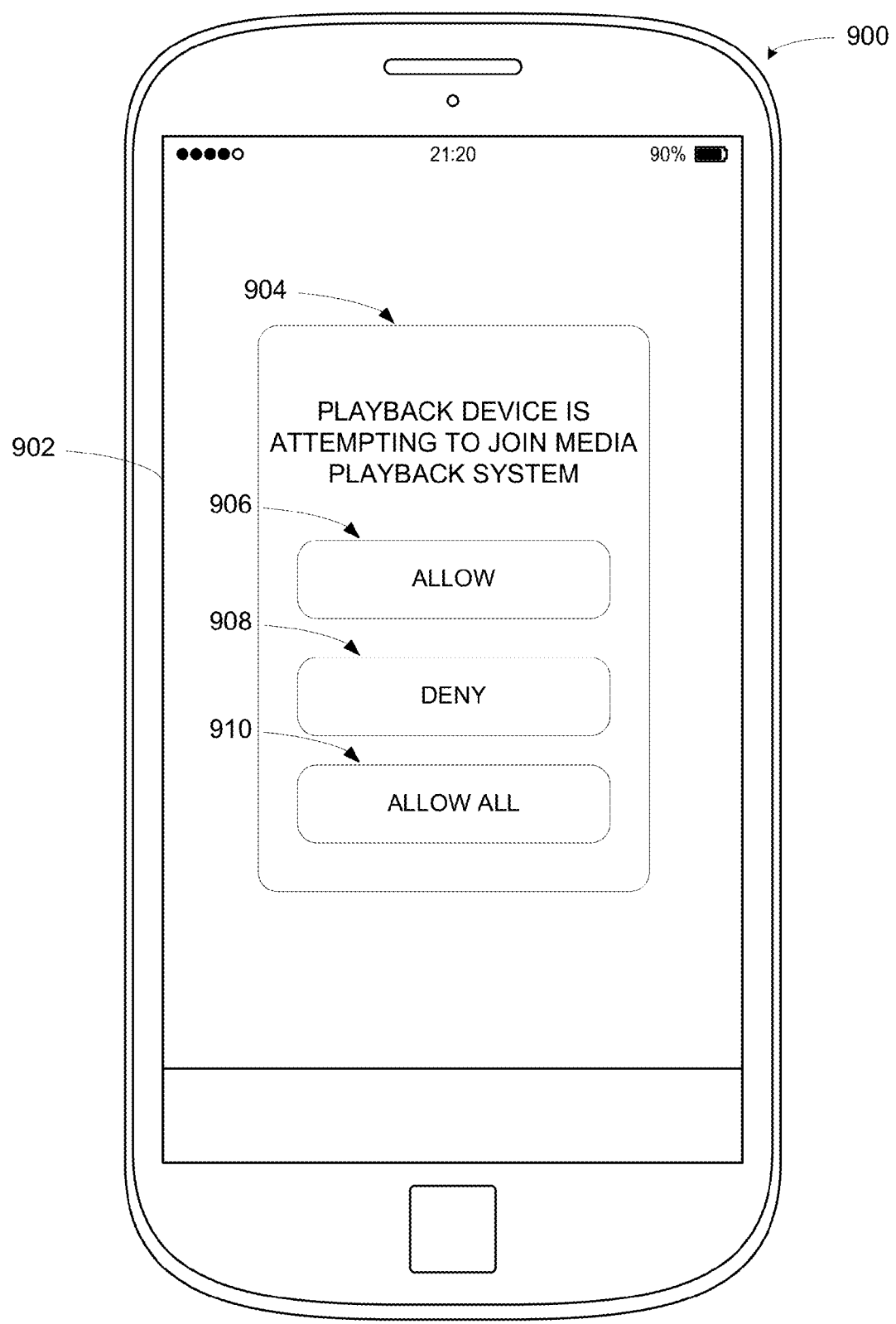
FIG. 9 shows an example control device and controller interface, according to an example embodiment.

FIG. 9 depicts a control device 900 (e.g., a smartphone) that includes one or more processors, a tangible computer-readable memory, a network interface, and a display. Control device 900 is displaying an example control interface 902. Control interface 902 includes a prompt 904 that indicates that a playback device is attempting to join the media playback system. By selecting selectable control 906, the playback device may be permitted to join the media playback system. Or, by selecting selectable control 908, the playback device may be prohibited from joining the media playback system. Further, by selecting selectable control 910, playback devices may be generally permitted to join the media playback system when placed on a device base of the media playback system.

d. Receive Message(s) that Enable the Playback Device to Join the Media Playback System In FIG. 6, at block 608, implementation 600 involves receiving one or more messages that enable the playback device to join the particular media playback system. For instance, referring to FIG. 5, playback device 500 may receive a message that indicates configuration and/or network parameters. By adopting such parameters, the playback device may join the media playback system that is associated with device base 502. As another example, referring to FIG. 8, control device 126 provides the configuration and network parameters of media playback system 100B to playback device 106 in SET 812 message. Such a SET message may enable playback device 106 to join media playback system 100B, as the configuration and network parameters may enable the playback device to connect to the network that interconnects devices of media playback system 100B and to operate with those devices as part of media playback system 100B. Example operations performed as part of a media playback system are provided above in connection with the example operating environments, as well as generally throughout the specification.

Receiving the one or more messages that enable the playback device to join the media playback system may involve sending a message or instruction that causes the playback device to join a particular zone of the media playback system to which the device base is associated. For instance, a given device base may be associated with a Living Room zone such being placed on that device base causes the playback device to join the Living Room zone. In some embodiments, the playback device may send an identifier of the base to the media playback system, perhaps with the request to join the media playback system. The identifier of the base may indicate to the media playback system that the playback device is on that particular base, which may cause the media playback system to send a message that enables or causes the playback device to join the zone that is associated with that base.

As a member of a zone, a playback device may operate as a functional unit. For instance, the zone may have its own pre-existing queue, which the playback device may adopt as its own queue. The zone may also have a pre-existing configuration defining certain operating parameters, which the playback device may adopt. For instance, the zone may have a particular equalization, which the playback device adopts upon joining the zone. Further examples related to zones of a media playback system are provided above in connection with the example operating environment, as well as generally throughout the specification.

In some cases, a zone may include multiple playback devices. In some configurations, receiving the one or more messages that enable the playback device to join the media playback system may involve sending a message or instruction that causes the playback device to assume a particular role within the zone. For example, an example message may cause a playback device to operate as a left channel of a stereo pair. Another example message may cause the playback device to operate as a surround channel of a surround sound configuration.

As a member of a zone, a playback device may operate as a functional unit with other playback devices of one or more additional zones that have been joined together into a zone group. By enabling or causing the playback device to join a zone, a message may also cause the playback to join a zone group. For instance, a Living Room zone and a Den zone may be joined together into a "Living Room+Den" zone group. As a zone group, the playback devices of both zones may play media in synchrony with one another. These playback devices may share the same queue and may also adopt the same configuration.

As noted above, some playback devices may implement a queue, such that they are configured to playback media items from the queue. Further, a zone of a media playback system may be associated with a queue such the playback device of the zone plays back media items from that queue of the zone. In such embodiments, by joining a zone, the playback device may adopt the pre-existing queue of the zone that is associated with the zone property. Adopting the queue may involve populating the queue of the playback device with the media items that are queued in the queue of the zone, perhaps by receiving an indication of the zone's queue from another playback device of the zone. In some instances, the playback device may remove any media items that were previously queued in its queue as part of adopting the queue of the zone, such that the playback device has a queue that matches the queue of the zone.

As noted above, in joining a zone, a playback device may begin to perform operations jointly with other playback devices of the zone. For instance, the playback device may play back a queue (e.g., an adopted queue) of media items in synchrony with one or more additional playback devices of the zone. Further, a playback device may perform operations jointly with playback devices of other zones that have been grouped into a zone group with the zone of the playback device.

As a member of a zone or zone group, commands directed to the zone or zone group may be carried out by the playback device. For instance, commands to initiate or pause playback by the zone or zone group may be carried out by the playback device. Likewise, changes to the queue of the zone or zone group may be propagated to the playback device (e.g., if a media item is queued in the zone's queue, the playback device may play back that media item when playback of the queue reaches that media item).

Referring back to FIG. 7, playback devices 106, 108, 112, and 114 are placed upon device bases 132, 134, 136, and 138, respectively. As noted above, these playback devices may detect that they are placed upon respective device bases of media playback system 100B and request to join media playback system 100B (perhaps given that they are configured to do so). Upon making such a request, playback devices 106, 108, 112, and 114 may receive respective messages that enable the playback devices to join the media playback system 100B. In some examples, such messages may enable playback devices 106, 108, 112, and 114 to join the respective zones that are associated with device bases 132, 134, 136, and 138, respectively (i.e., the Living Room, Dining Room, and Kitchen zones).

Upon being removed from a device base, a playback device may leave the media playback system. For instance, referring to FIG. 5, playback device 500 may detect its removal from device base 502 and responsively disjoin from the media playback system that is associated with device base 502. Leaving the media playback system may cause the playback device to change configuration. For instance, the playback device may no longer have the same configuration and network parameters as when the playback device was part of the system. If the playback device had adopted a queue, the playback device may dis-associate from that queue. Further, the playback device may no longer be configured to operate jointly with other devices of the media playback system. For example, control devices of the media playback system may no longer have control over the playback device.

In some cases, the message that enables the playback device to join the media playback system may include an instruction or other message that causes the playback device to join the media playback system while the playback device remains on the playback device. Then, upon removal of the playback device from the device base, the playback device may automatically leave the media playback system. In other cases, the message that enables the playback device to join the media playback system may include an instruction or other message that causes the playback device to remain with the media playback system even if the playback device is removed from the device base. In such examples, access to the system by the playback device may be limited in other ways.

In some cases, a playback device may join a zone that does not currently include any other playback devices. In a sense, by joining such a zone, the playback device can be considered to have formed that zone. By extension, by a playback device leaving the zone, the playback device may cause the zone to have no playback devices (given that no other playback devices had joined the zone since the playback device had joined that zone). However, the device base may retain its association with the zone, such that when a playback device is placed again on the device base, the zone may be formed again by that playback device when the playback device placed upon the device base.

By placing a playback device onto a device base and causing the playback device to be assigned a zone property associated with a particular zone, the name of the playback device may be changed to the name of that particular zone. For example, a given device base may be associated with a Living Room zone. Upon being placed on that device base, a playback device may join the Living Room zone, which may cause the name of the playback device to be changed to "Living Room." When the playback device is removed from that device base, the playback device may change its name again (e.g., to "Portable"). Such name changes may indicate that the playback device is a member of a particular zone, or that the playback device is operating as a portable device, among other examples.

In some embodiments, a playback device may join a media playback system as a "guest" device when being placed on a device base that is associated with the media playback system, but be more permanently registered with a "home" media playback system. For instance, a user may register their playback device with their home media playback system (i.e., a first media playback system), but bring the playback device over to a friend's house for use as a "guest" device with the friend's media playback system (i.e., a second media playback system). To distinguish a "guest" device from more permanently registered playback devices, such a guest device may be assigned a name that reflects the Guest status (e.g., "Guest Device" or "Guest). Control devices of the media playback system may indicate this device name when indicating the guest device.

As a guest device of the second media playback system, the playback device may adopt the configuration and/or network parameters of the second playback system, but store the configuration and/or network parameters of the first playback system for later use. For example, upon leaving the second media playback system, the playback device may re-adopt the configuration and/or network parameters of the first playback system. Alternatively, the playback device may re-adopt the configuration and/or network parameters of the first playback system when back in range of the first media playback system.

Within examples, some media playback systems may restrict access to a playback device that joins a media playback system based on being placed on a device base (e.g., as a guest device). For example, as noted above, such a playback device may be restricted to operating as part of a given media playback system while the playback device remains placed upon the device base that is associated with the media playback system (which may perhaps prevent the playback device from remaining in the media playback system when operating as a portable (i.e., battery-powered) device). As another example, such a playback device may obtain registration on a limited basis. A limited registration with a media playback system may permit the playback device to remain a part of the media playback system for a certain amount of time (e.g., a few hours) or for a limited number of media item plays (e.g., playback of 20 media items). For example, a playback device that is joined to a media playback system may determine that the limited registration has expired (e.g., that a pre-determined period of time has expired) and responsively leave the media playback system.

The playback device may also be limited to certain media services. For instance, upon joining a media playback system as a guest (by being placed upon a device base), the playback device might not be able to access media services (e.g., streaming media services, such as Spotify®) that are registered with that media playback system. Instead, the playback device may be able to access media services with which the playback device's "home" media playback system is registered, which may or might not include some of the same services. Note that even if the same services are registered with two or more media playback system, each registration may be tied to a different account (e.g., accounts registered to different email addresses or other user names).

IV. Example Techniques to Transfer Favorites Between Media Playback Systems

As discussed above, embodiments described herein may facilitate a playback device joining a media playback system. In some examples, the playback device may have favorites that were previously configured on the playback device when the playback device was part of another media playback system. When joining the media playback system, such favorites may be transferred (e.g., cross-linked) for use with the second media playback system. FIG. 10 illustrates an example implementation 1000 by which a playback device transfers favorites for use with a second media playback system.

a. Join a Playback Device Associated with a First Media Playback System to a Second Media Playback System At block 1002, implementation 1000 involves joining a playback device associated with a first media playback system to a second media playback system. For instance, a playback device that was previously joined to a first media playback system (e.g., a "home" media playback system) may join a second media playback system (perhaps as a "guest" device). In some examples, the playback device may join the second media playback system upon being placed on a device base that is associated with the second media playback system, perhaps using techniques described above in connection with implementation 600 of FIG. 6.

b. Identify One or More Media Items Stored as Favorites Associated with the First Media Playback System In FIG. 10, at block 1004, implementation 1000 involves identifying one or more media items that have been stored as favorites associated with the first media playback system. A favorite may be any media item or container of media items (track, album, playlist, or internet radio station) that has been configured as a favorite. Each favorite media item may be associated with a media source (e.g., a streaming media URI or local storage path) from which the media item can be retrieved and played back. An identifier of each favorite media item may be stored on the playback device. A media playback system may identify such favorite media items associated with a playback device when the playback device is joined to the media playback system or when the favorite media item is selected for playback, among other examples.

Such favorites may be accessible through a control interface (e.g., buttons) on the playback device itself and/or through a control interface on a control device. For instance, an example control device may include five favorite buttons. Selection of a particular favorite button may cause the playback device to begin playing back a particular media item (e.g., a track, album, playlist, or internet radio station) from a particular source. Likewise, a control interface may include one or more selectable controls which correspond to respective favorite media items. Such functionality may appear in practice to be similar to radio pre-sets that link to specific frequencies. However, instead of linking to a frequency, the favorite control links to a network location via a path or URI. A URI, or uniform resource locator, may indicate a source of the media item from a streaming media service or other network location.

Figure 11:
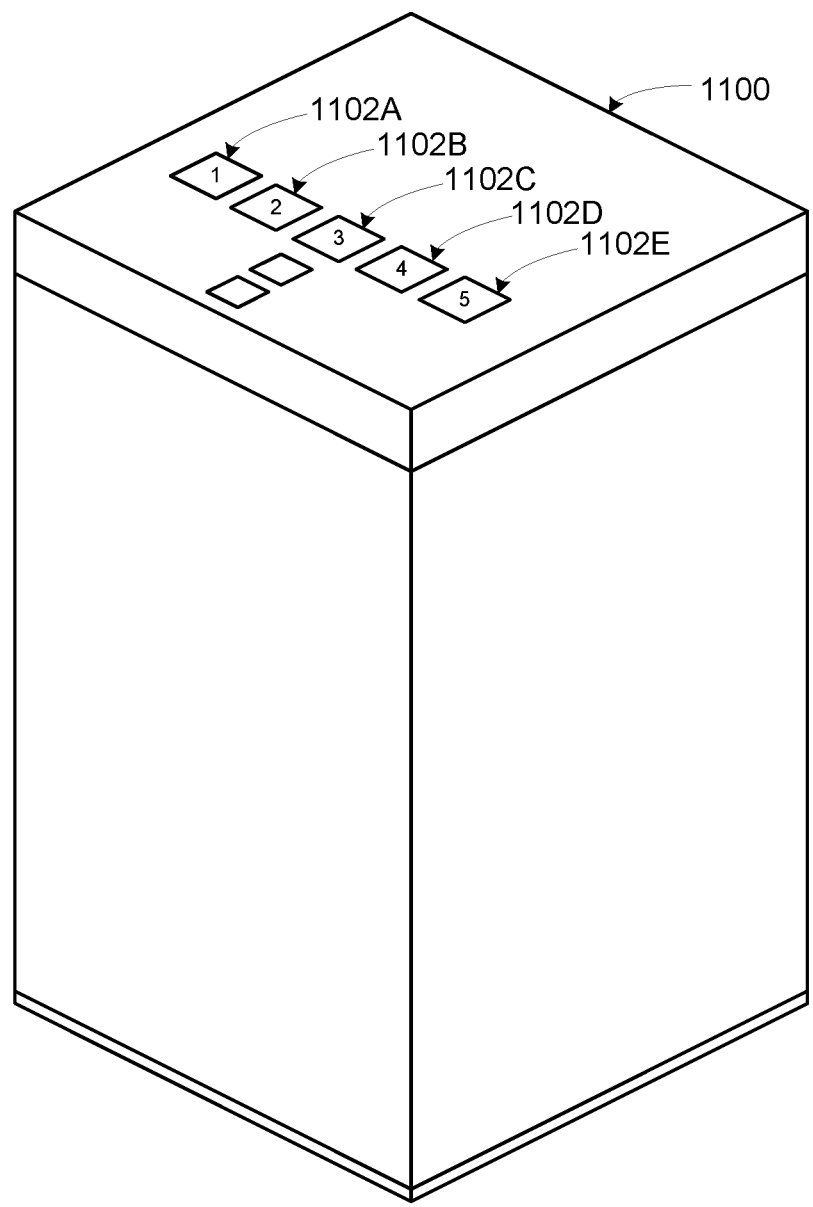
FIG. 11 shows an example playback device, according to an example embodiment.

To illustrate, FIG. 11 depicts a playback device 1100, which may be an embodiment of playback device 200 of FIG. 2, among other examples. Playback device 1100 includes favorite buttons 1102A, 1102B, 1102C, 1102D, and 1102E. Each of these favorite buttons may be configured to link to a particular instance of a media item such that when the button is pressed, playback device 1100 begins playing the particular instance of the media item from a given path or URI.

Figure 12:
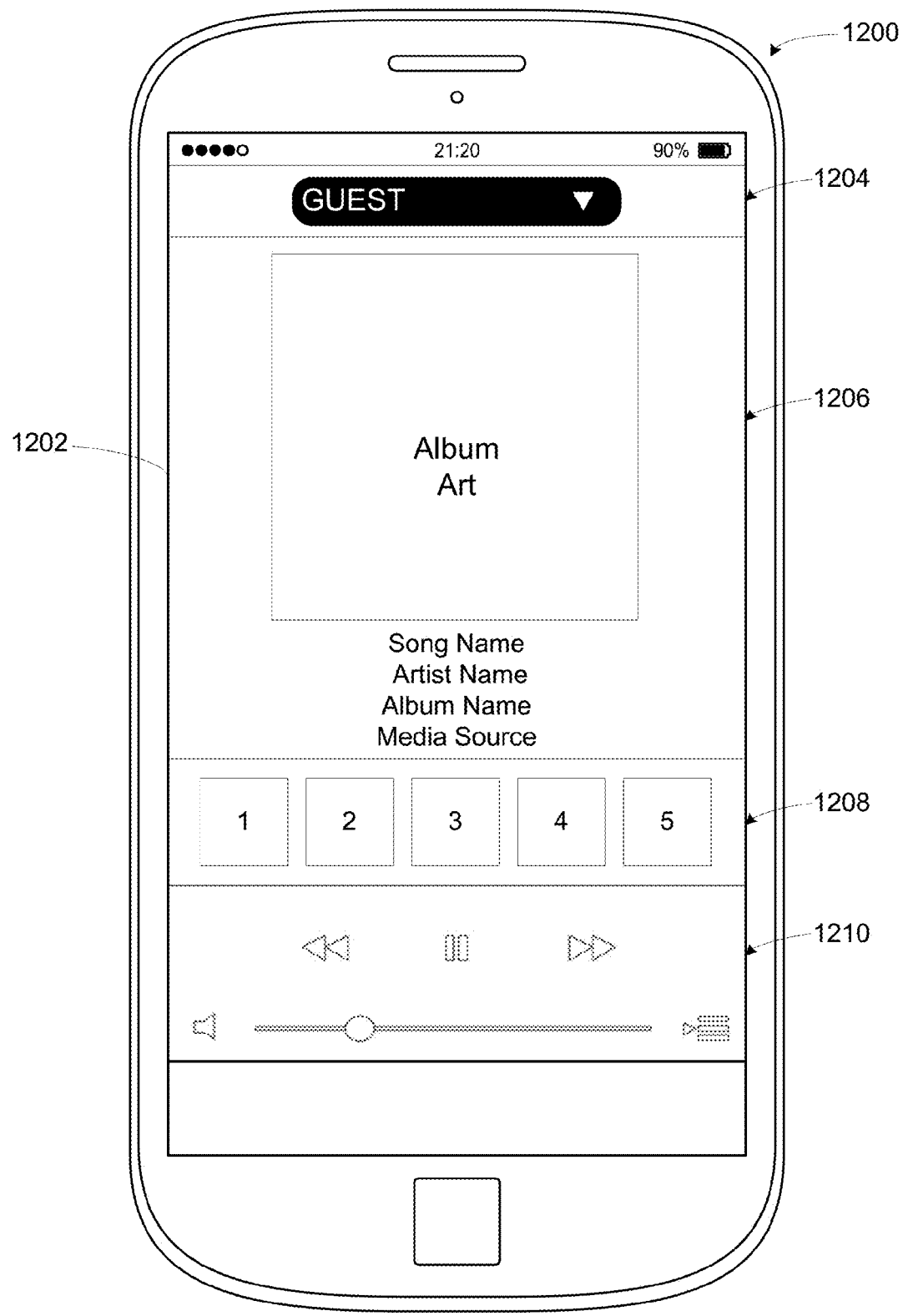
FIG. 12 shows an example control device and controller interface, according to an example embodiment.

As another example, FIG. 12 depicts a control device 1200 (which is implemented as a smartphone). Control device 1200 is displaying a control interface 1202 that includes controls for media playback system 100B of FIG. 7. More particularly, control interface 1202 includes a playback zone region 1204, a playback status region 1206, a favorite region 1208, and a playback control region 1210. A control interface, such as control interface 600A, may correspond to a particular device or zone of a media playback system (e.g., a Guest device or Guest zone of a media playback system).

A playback zone region of a control interface may include a representation of the zone with which the control interface is associated. As shown in FIG. 12, playback zone region 1204 includes an indication of a "Guest" zone of media playback system 100B, which includes a playback device that has joined media playback system 100B upon being placed on a device base that is associated with media playback system 100B.

Within examples, a playback status region includes a representation of audio content that is presently being played, previously played, or scheduled to play next in the Guest zone. Playback status region 1206 includes contextual information about the "Guest" zone, including information about media that is currently playing or queued by playback device(s) of the zone. The information includes Album Art, Track Name, Artist Name, and Media Source, which represent metadata of the media that is currently playing or queued in the zone.

A favorite region includes controls to select favorites. As shown, favorite region 1208 includes five favorite controls. Each of the favorite controls may be configured to link to a particular instance of a media item such that when the control is selected, the Guest playback device(s) begin playing the particular instance of the media item from a given path or URI.

A playback control region includes transport controls for the zone. Playback control region 1210 includes transport controls for the "Guest" zone. Such controls may initiate, stop, or modify playback by playback devices the playback devices in the "Guest" zone.

c. Determine that Given Media Source of Media Item is Inaccessible to Second Media Playback System Referring back to FIG. 10, at block 1006, implementation 1000 involves determining that a given media source of at least one favorite media item is inaccessible to the second media playback system. In some cases, the favorites assigned to a given playback device may have been configured when the playback device was joined to a first media playback system (e.g., a "home" or "primary" media playback system). Upon being placed on a device base that is associated with a second media playback system, the playback device may automatically join the second media playback system. However, the second media playback system might not have access to the same media sources as the first media playback system, such that the favorite media items that were configured when the playback device was joined to the first media playback system are inaccessible.

In some cases, to determine whether the respective media sources of favorite media items are accessible by the second media playback system, the second media playback system may attempt to access or retrieve (e.g., stream) the media item from the source that was associated with the favorite by the first media playback system. If the playback device is able to access a favorite media item when joined to the second media playback system, then it is determined that the media source of the favorite media item is accessible to the second media playback system. Conversely, if the playback device is unable to access the favorite media item when joined to the second media playback system, then it is determined that the media source of the favorite media item is inaccessible to the second media playback system.

Alternatively, the second media playback system may determine whether the respective media sources of favorite media items are accessible by the second media playback system via identifiers of the favorite media items. Within examples, identifiers of each favorite may be stored as universal IDs (which identify the favorite across multiple sources) or as locally significant IDs (which identify the favorite across sources accessible to a media playback system). Such identifiers may be stored on the playback device or in the cloud (i.e., on a server that is providing a cloud service). To determine whether the respective media sources of favorite media items are accessible by the second media playback system, the second media playback system may search across media sources available to the second media playback system for such identifiers.

d. Identify a Second Instance of Media Item from Among Media Sources Accessible to the Second Media Playback System Referring again to FIG. 10, at block 1008, implementation 1000 involves identifying a second instance of the media item from among media sources accessible to the second media playback system. The playback device may configure a favorite button or control to play the second instance of the media item so as to cross-link the media item from a first source (accessible to the first media playback system) to a second source (accessible to the second media playback system) and possibly initiate playback of the second instance of the media item (perhaps given that the favorite button or control was selected).

To identify the second instance of the media item, the media playback system may search across media sources available to the second media playback system. The media playback system may search by an identifier of the favorite media item, or by metadata, among other examples. For instance, a favorite might be linked to a playlist of media items from a first media service (e.g., Spotify®). If the second system is not registered with the first media service, the playback device may search for versions of the media items from one or more second services (e.g., Apple Music® or Tidal®). In this way, the favorite may continue to link to the same playlist of media items when the playback device is part of the second media playback system, but from one or more different sources that are accessible to the second media playback system.

Certain media items might not need to be cross-linked. For instance, some media sources, such as Internet radio stations, may be universally accessible. Alternatively, the second media playback system may be registered with the one or more of the same service(s) as the first media playback system, such that the second media playback system can access the favorite media item from the same service as the first media item. In such cases, some translation of the media source (e.g., URI) might be involved, as the second media playback system may access the media item using a different user account or session identifier corresponding to the second media playback system.

V. Second Example Techniques to Join a Playback Device to a Device Base

As discussed above, embodiments described herein may facilitate a playback device joining a media playback system when placed onto a device base. FIG. 13 illustrates an example implementation 1300 by which a playback device joins a media playback system when placed upon a device base that is associated with the device base.

a. Detect Placement of a Playback Device onto a Base

At block 1302, implementation 1300 involves detecting placement of a playback device onto a base. For instance, referring back to FIG. 5, device base 502 detect placement of playback device 500 onto device base 502.

In some embodiments, a device base may detect placement of a playback device onto a base by way of a physical trigger. For instance, a playback device may be designed to trigger a switch or other mechanism of the device base when a playback device is placed upon the device base. In such cases, by detecting triggering of the switch or mechanism, the device base detects placement onto the device base. As another example, a device base may detect placement upon completing a circuit with the playback device (such when charging a battery of the playback device from a device base).

Alternatively, a device base may detect placement of a playback device by way of a radio signal between the playback device and the device base. For instance, the playback device and the device base may include respective radio interfaces (e.g., near-field wireless communications interfaces such as NFC (near field communications) or BLUETOOTH® LE). A device may detect placement of a playback device upon receiving a message from the playback device.

As noted above, a device base may use a near-field wireless communications interface, which may have a limited range such that the playback device is in range of the device base when the playback device is placed on or nearby the device base. Shielding the antenna of such a communications interface may further limit and orient its communications range, which may prevent communications between a playback device and a device base when the playback device is not on the device base.

b. Listen for a Request to Join Media Playback Systems

At block 1304, implementation 1300 involves listening for a request to join media playback systems. For instance, playback device 500 may send a request to join media playback systems or possibly to join a particular media playback system to which device base 502 is associated. In some embodiments, playback device 500 may send such a request automatically, perhaps in response to detecting placement upon device base 502, or in response to determining that playback device 500 is configured to automatically join media playback systems. A device base 502 may include a communications interface to listen for such requests.

In some implementations, the playback device may send the request according to a particular protocol, such as SONOS® Netstart or APPLE® Wireless Accessory Configuration (WAC). In operation, a device base of a media playback system may listen for messages conforming to such a protocol. Further, such protocols may permit the playback device to communicate with the device base of the media playback system without being connected to the network that interconnects the devices of the media playback system. By way of example, referring back to FIG. 8, a playback device broadcasts an ALIVE message, which indicates a request to join a media playback system. A device base may receive such a message and take steps to join the playback device to the media playback system.

So as to avoid continually looking for requests to join the media playback system, the device base may listen for requests for a pre-determined period of time (or less, if the device base receives such a request). For instance, device base 502 may listen for 30 seconds after detecting that a playback device has been placed upon device base 502. If a request is not received during such a period, the device base 502 may stop listening (and may put its communications interface in a low-power mode).

c. Send Request to Join the Playback Device to the Media Playback System

At block 1306, implementation 1300 involves sending a request to join the playback device to a media playback system. For instance, given that device base 502 is associated with a particular media playback system, device base 502 may send a request to that media playback system (e.g., to a control device or a playback device thereof) to join playback device 500 to the particular media playback system. Such a request may include any combination of the features described in connection with block 606, among other examples.

d. Receive a Message Indicating that the Playback Device is Permitted to Join the Media Playback System At block 1308, implementation 1300 involves receiving a message indicating that the playback device is permitted to join the media playback system. For instance, device base 502 may receive configuration and/or network parameters from its media playback system, which may indicate that the media playback system is permitting playback device 500 to join the media playback system. As another example, device base 502 may receive an instruction to provide configuration and/or network parameters of the media playback system to playback device 500, which may indicate that playback device 500 is permitted to join the media playback system.

e. Send a Message that Enables the Playback Device to Join the Media Playback System At block 1310, implementation 1300 involves sending a message that enables the playback device to join the media playback system. For instance, device base 502 may send a message indicating configuration and/or network parameters to playback device 500, which playback device 500 may adopt to join the media playback system associated with device base 500. To further illustrate, referring back to FIG. 8, device base 502 may send a SET message to playback device 500. Receiving such a message may cause playback device to automatically join the media playback system. Further examples related to such a message are described above in connection with block 608 of FIG. 6.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The following examples set out further or alternative aspects of the disclosure. The device in any of the following examples may be a component of any of the devices described herein or any configuration of a device described herein.

(Feature 1) A playback device configured for:

detecting placement of the playback device onto a device base of a particular media playback system, wherein the particular playback system comprises one or more additional playback devices;

determining that the playback device is configured to automatically join media playback systems;

based on determining that the playback device is configured to automatically join media playback systems, sending, to the particular media playback system, a request to join the particular media playback system; and receiving, from the media playback system, one or more messages that enable the playback device to join the particular media playback system.

(Feature 2) The playback device of feature 1, wherein determining that the playback device is configured to automatically join media playback systems comprises determining that the playback device is not joined to any other media playback system.

(Feature 3) The playback device of any preceding feature, wherein the one or more control devices and the one or more additional playback devices of the particular media playback system are interconnected via a network, and wherein receiving the one or more messages that enable the playback device to join the media playback system comprises receiving a message that enables the playback device to connect to the one or more control devices and the one or more additional playback devices of the media playback system via the network.

(Feature 4) The playback device of any of features 1-2, wherein the device base is assigned to a particular zone of the media playback system, and wherein receiving the one or more messages that enable the playback device to join the media playback system comprises receiving a message that enables the playback device to join the particular zone of the media playback system to which the device base is assigned.

(Feature 5) The playback device of feature 4, wherein enabling the playback device to join the particular zone of the media playback system comprises causing the playback device to join a zone that consists of the playback device.

(Feature 6) The playback device of feature 4, wherein enabling the playback device to join the particular zone of the media playback system comprises causing the playback device to join a zone as a first channel of a stereo pair that includes an additional playback device as a second channel of the stereo pair.

(Feature 7) The playback device of feature 4, wherein the particular zone is a first zone of a zone group that includes a second zone of one or more given playback devices, and wherein receiving the one or more messages that enable the playback device to join the media playback system comprises receiving an instruction that causes the playback device to join the zone group such that the playback device and the one or more given playback devices are configured to playback media in synchrony.

(Feature 8) The playback device of feature 4, wherein the particular zone is configured to play back media items from a pre-existing queue, and wherein joining the particular zone of the media playback system comprises adopting the pre-existing queue of media items as the queue of the playback device.

(Feature 9) The playback device of any preceding feature, wherein detecting placement of the playback device onto the device base of the particular media playback system comprises:
    identifying the device base onto which the playback device is placed; and
    determining that the identified device base is associated with the particular media playback system of one or more additional playback devices.

(Feature 10) The playback device of feature 9, wherein sending the request to join the particular media playback system comprises broadcasting a request indicating that the playback device is placed onto the identified device base which is assigned to the particular media playback system.

(Feature 11) The playback device of feature 9, The playback device of claim 9, wherein identifying the device base onto which the playback device is placed comprises receiving, from the device base, a signal indicating an identifier that uniquely identifies the device base.

(Feature 12) The playback device of any preceding feature, wherein the playback device is further configured for comprise charging a battery of the first playback device from current delivered through the particular device base while the playback device is placed on the particular device base.

(Feature 13) The playback device of any preceding feature, wherein receiving the one or more messages that enable the playback device to join the particular media playback system comprises receiving an instruction that causes the playback device to join the particular media playback system while the playback device remains on the device base.

(Feature 14) The playback device of feature 13, wherein the playback device is further configured for:
    detecting removal of the playback device from the device base; and
    responsively, disjoining the playback device from the particular media playback system.

(Feature 15) The playback device of any preceding feature, wherein receiving the one or more messages that enable the playback device to join the particular media playback system comprises receiving a message that enables the playback device to join the particular media playback system for a pre-determined period of time, and wherein playback device is further configured for:
    determining that the pre-determined period of time has expired; and
    responsively, disjoining the playback device from the particular media playback system.

(Feature 16) The playback device of any of features 1-15, wherein the particular media playback system is a first media playback system; and wherein playback device is further configured for:
    detecting selection of a selectable control that, when selected, causes the playback device to play back a particular media item that has been stored as a favorite of a second media playback system, wherein the selectable control is configured to play back the particular media item from a given media source that is accessible to the second media playback system;
    determining that the given media source is accessible by the first media playback system;
    based on determining that the given media source is accessible to the first media playback system, playing back the particular media item from the media source.

(Feature 17) The playback device of any of features 1-15, wherein the particular media playback system is a first media playback system; and wherein playback device is further configured for:
    detecting selection of a selectable control that, when selected, causes the playback device to play back a particular media item that has been stored as a favorite of a second media playback system, wherein the selectable control is configured to play back a first instance of the particular media item from a given media source that is accessible by the second media playback system;
    determining that the given media source is inaccessible by the first media playback system; and
    based on determining that the given media source is inaccessible by the first media playback system, identifying, among media sources that are accessible by the first media playback system, a second instance of the particular media item and playing back the second instance of the particular media item from a media source that is accessible by the first media playback system.

(Feature 18) The playback device of any of features 1-15, wherein the particular media playback system is a first media playback system; and wherein playback device is further configured for:
    identifying a media item that has been stored on the playback device as a favorite of a second media playback system, wherein selection of a particular selectable control of the playback device causes the playback device to play a first instance of the media item from a given media source that is accessible to the second media playback system;
    determining that the given media source is inaccessible to the first media playback system;
    based on determining that the given media source is inaccessible to the first media playback system, identifying, among media sources that are accessible by the first media playback system, a second instance of the media item and configuring the particular selectable control such that selection causes the playback device to play the second instance of the media item from a media source that is accessible to the first media playback system.

(Feature 19) A device base comprising a base, the device base configured for detecting placement of a playback device onto the base;
    responsively, listening for a request to join media playback systems;
    upon receiving the request to join media playback systems from the playback device, sending, to a media playback system that is associated with the device base, a request to join the playback device to the media playback system;

receiving, from the media playback system, a message indicating that the playback device is permitted to join the media playback system; and responsively, sending a message that enables the playback device to join the media playback system.

(Feature 20) The device base of feature 19, wherein the device base is interconnected with the one or more control devices and the one or more additional playback devices of the particular media playback system via a network, and wherein sending the message that enables the playback device to join the media playback system comprises sending an instruction that connects the playback device to the one or more control devices and the one or more additional playback devices of the media playback system via the network.

(Feature 21) The device base of feature 19, wherein the device base is assigned to a particular zone of the media playback system, and wherein sending the message that enables the playback device to join the media playback system comprises sending an instruction that causes the playback device to join the particular zone of the media playback system to which the device base is assigned.

(Feature 22) The device base of feature 21, wherein enabling the playback device to join the particular zone of the media playback system comprises causing the playback device to join a zone that consists of the playback device.

(Feature 23) The device base of feature 21, wherein enabling the playback device to join the particular zone of the media playback system comprises causing the playback device to join a zone as a first channel of a stereo pair that includes an additional playback device as a second channel of the stereo pair.

(Feature 24) The device base of feature 21, wherein the particular zone is a first zone of a zone group that includes a second zone of one or more given playback devices, and wherein sending the message that enables the playback device to join the media playback system comprises sending an instruction that causes the playback device to join the zone group such that the playback device and the one or more given playback devices are configured to playback media in synchrony.

(Feature 25) The device base of feature 21, wherein the particular zone is configured to play back media items from a pre-existing queue, and wherein enabling the playback device to join the particular zone of the media playback system comprises causing the playback device to adopt the pre-existing queue of media items as the queue of the playback device.

(Feature 26) The device base of any preceding feature, wherein the device base is further configured for charging a battery of the first playback device from current delivered through the base while the playback device is placed on the base.

(Feature 27) The device base of any preceding feature, wherein sending the message that enables the playback device to join the media playback system comprises sending a message that enables the playback device to join the particular media playback system while the playback device remains on the base.

(Feature 28) The device base of any preceding feature, wherein the device base is further configured for:

detecting removal of the playback device from the base; and responsively, disjoining the playback device from the media playback system.

(Feature 29) The device base of any of features 19-27, wherein sending the message that enables the playback device to join the particular media playback system comprises sending a message that enables the playback device to join the particular media playback system for a pre-determined period of time, and wherein the operations further comprise:

determining that the pre-determined period of time has expired; and responsively, disjoining the playback device from the media playback system.

(Feature 30) The device base of any of features 19-28, wherein sending the message that enables the playback device to join the particular media playback system comprises sending a message that enables the playback device to join the particular media playback system until a threshold number of media items have been played back, and wherein the operations further comprise:

determining that the threshold number of media items have been played back; and responsively, disjoining the playback device from the media playback system.

(Feature 31) The device base of any of features 19-28, wherein sending the message that causes the playback device to join the particular media playback system comprises sending a message that enables the playback device to join the particular media playback system until a threshold duration of playback time has elapsed, and wherein the operations further comprise:

determining that the threshold duration of playback time has elapsed; and responsively, disjoining the playback device from the media playback system.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
 a network interface;
 an audio stage comprising one or more amplifiers and one or more audio processing components;
 one or more processors;
 a tangible data storage having stored therein instructions executable by the one or more processors to cause the playback device to perform operations comprising:
 detecting placement of the playback device onto a device base of a particular media playback system, wherein the particular media playback system comprises one or more additional playback devices;

determining whether the playback device is configured to automatically join media playback systems;

in response to detecting placement of the playback device onto the device base of the particular media playback system and when the playback device is configured to automatically join media playback systems, sending, to the particular media playback system, a request to join the particular media playback system; and receiving, from the media playback system in response to the request to join the particular media playback system, one or more messages that enable the playback device to join the particular media playback system for audio playback via the audio stage, wherein the playback device is controllable, via the network interface, by one or more control devices of the media playback system while the playback device is joined to the particular media playback system, and wherein the one or more control devices are incompatible with placement on the device base.

2. The playback device of claim 1, wherein determining whether the playback device is configured to automatically join media playback systems comprises determining that the playback device is not joined to any other media playback system.

3. The playback device of claim 1, wherein the one or more control devices and the one or more additional playback devices of the particular media playback system are interconnected via a network, and wherein receiving the one or more messages that enable the playback device to join the particular media playback system comprises receiving a message that enables the playback device to connect to the one or more control devices and the one or more additional playback devices of the particular media playback system via the network.

4. The playback device of claim 1, wherein the device base is assigned to a particular zone of the particular media playback system, and wherein receiving the one or more messages that enable the playback device to join the particular media playback system comprises receiving a message that enables the playback device to join the particular zone of the particular media playback system to which the device base is assigned.

5. The playback device of claim 4, wherein enabling the playback device to join the particular zone of the particular media playback system comprises causing the playback device to join a zone that consists of the playback device.

6. The playback device of claim 4, wherein enabling the playback device to join the particular zone of the particular media playback system comprises causing the playback device to join a zone as a first channel of a stereo pair that includes an additional playback device as a second channel of the stereo pair.

7. The playback device of claim 4, wherein the particular zone is a first zone of a zone group that includes a second zone of one or more given playback devices, and wherein receiving the one or more messages that enable the playback device to join the particular media playback system comprises receiving an instruction that causes the playback device to join the zone group such that the playback device and the one or more given playback devices are configured to playback media in synchrony.

8. The playback device of claim 4, wherein the particular zone is configured to play back media items from a pre-existing queue of media items, and wherein joining the particular zone of the particular media playback system comprises adopting the pre-existing queue of media items as the queue of the playback device.

9. The playback device of claim 1, wherein detecting placement of the playback device onto the device base of the particular media playback system comprises:

identifying the device base onto which the playback device is placed; and determining that the identified device base is associated with the particular media playback system comprising the one or more additional playback devices.

10. The playback device of claim 9, wherein sending the request to join the particular media playback system comprises broadcasting a request indicating that the playback device is placed onto the identified device base which is assigned to the particular media playback system.

11. The playback device of claim 9, wherein identifying the device base onto which the playback device is placed comprises receiving, from the device base, a signal indicating an identifier that uniquely identifies the device base.

12. The playback device of claim 1, wherein the operations further comprise charging a battery of the playback device from current delivered through the device base while the playback device is placed on the device base.

13. The playback device of claim 1, wherein receiving the one or more messages that enable the playback device to join the particular media playback system comprises receiving an instruction that causes the playback device to join the particular media playback system while the playback device remains on the device base.

14. The playback device of claim 13, wherein the operations further comprise:

detecting removal of the playback device from the device base; and responsively, disjoining the playback device from the particular media playback system.

15. The playback device of claim 1, wherein receiving the one or more messages that enable the playback device to join the particular media playback system comprises receiving a message that enables the playback device to join the particular media playback system for a pre-determined period of time, and wherein the operations further comprise:

determining that the pre-determined period of time has expired; and responsively, disjoining the playback device from the particular media playback system.

16. The playback device of claim 1, wherein the particular media playback system is a first media playback system; and wherein the operations further comprise:

detecting selection of a selectable control that, when selected, causes the playback device to play back a particular media item that has been stored as a favorite of a second media playback system, wherein the selectable control is configured to play back the particular media item from a given media source that is accessible to the second media playback system;

determining that the given media source is accessible by the first media playback system; and based on determining that the given media source is accessible to the first media playback system, playing back the particular media item from the given media source.

17. The playback device of claim 1, wherein the particular media playback system is a first media playback system; and wherein the operations further comprise:

detecting selection of a selectable control that, when selected, causes the playback device to play back a particular media item that has been stored as a favorite of a second media playback system, wherein the selectable control is configured to play back a first instance of the particular media item from a given media source that is accessible by the second media playback system;
determining that the given media source is inaccessible by the first media playback system; and
based on determining that the given media source is inaccessible by the first media playback system, identifying, among media sources that are accessible by the first media playback system, a second instance of the particular media item and playing back the second instance of the particular media item from a media source that is accessible by the first media playback system.

18. The playback device of claim 1, wherein the particular media playback system is a first media playback system; and wherein the operations further comprise:
identifying a media item that has been stored on the playback device as a favorite of a second media playback system, wherein selection of a particular selectable control of the playback device causes the playback device to play a first instance of the media item from a given media source that is accessible to the second media playback system;
determining that the given media source is inaccessible to the first media playback system; and
based on determining that the given media source is inaccessible to the first media playback system, identifying, among media sources that are accessible by the first media playback system, a second instance of the media item and configuring the particular selectable control such that selection causes the playback device to play the second instance of the media item from a media source that is accessible to the first media playback system.

19. A method comprising:
detecting, by a playback device, placement of the playback device onto a device base of a particular media playback system, wherein the particular media playback system comprises one or more additional playback devices;
determining whether the playback device is configured to automatically join media playback systems;
in response to detecting placement of the playback device onto the device base of the particular media playback system and when the playback device is configured to automatically join media playback systems, sending, to the particular media playback system, a request to join the particular media playback system; and
receiving, from the media playback system in response to the request to join the particular media playback system, one or more messages that enable the playback device to join the particular media playback system for audio playback via an audio stage of the playback device, wherein the playback device is controllable, via a network interface of the playback device, by one or more control devices of the media playback system while the playback device is joined to the particular media playback system, and wherein the one or more control devices are incompatible with placement on the device base.

20. The method of claim 19, wherein the device base is assigned to a particular zone of the particular media playback system, and wherein receiving the one or more messages that enable the playback device to join the particular media playback system comprises receiving a message that enables the playback device to join the particular zone of the particular media playback system to which the device base is assigned.

21. The method of claim 20, wherein enabling the playback device to join the particular zone of the particular media playback system comprises causing the playback device to join a zone that consists of the playback device.

22. The method of claim 20, wherein the particular zone is a first zone of a zone group that includes a second zone of one or more given playback devices, and wherein receiving the one or more messages that enable the playback device to join the particular media playback system comprises receiving an instruction that causes the playback device to join the zone group such that the playback device and the one or more given playback devices are configured to playback media in synchrony.

23. The method of claim 20, wherein the particular zone is configured to play back media items from a pre-existing queue of media items, and wherein joining the particular zone of the particular media playback system comprises adopting the pre-existing queue of media items as the queue of the playback device.

24. The method of claim 19, wherein detecting placement of the playback device onto the device base of the particular media playback system comprises:
identifying the device base onto which the playback device is placed; and
determining that the identified device base is associated with the particular media playback system comprising the one or more additional playback devices.

25. The method of claim 19, wherein receiving the one or more messages that enable the playback device to join the particular media playback system comprises receiving an instruction that causes the playback device to join the particular media playback system while the playback device remains on the device base.

26. The method of claim 25, further comprising:
detecting removal of the playback device from the device base; and
responsively, disjoining the playback device from the particular media playback system.

27. The method of claim 19, wherein the particular media playback system is a first media playback system; and wherein the method further comprises:
identifying a media item that has been stored on the playback device as a favorite of a second media playback system, wherein selection of a particular selectable control of the playback device causes the playback device to play a first instance of the media item from a given media source that is accessible to the second media playback system;
determining that the given media source is inaccessible to the first media playback system; and
based on determining that the given media source is inaccessible to the first media playback system, identifying, among media sources that are accessible by the first media playback system, a second instance of the media item and configuring the particular selectable control such that selection causes the playback device to play the second instance of the media item from a media source that is accessible to the first media playback system.

28. A non-transitory computer-readable medium having stored therein instructions executable by one or more processors to cause a playback device to perform operations comprising:
detecting placement of the playback device onto a device base of a particular media playback system, wherein the particular media playback system comprises one or more additional playback devices;

determining whether the playback device is configured to automatically join media playback systems;

in response to detecting placement of the playback device onto the device base of the particular media playback system and when the playback device is configured to automatically join media playback systems, sending, to the particular media playback system, a request to join the particular media playback system; and receiving, from the media playback system in response to the request to join the particular media playback system, one or more messages that enable the playback device to join the particular media playback system for audio playback via an audio stage of the playback device, wherein the playback device is controllable, via a network interface of the playback device, by one or more control devices of the media playback system while the playback device is joined to the particular media playback system, and wherein the one or more control devices are incompatible with placement on the device base.

29. The non-transitory computer-readable medium of claim 28, wherein the device base is assigned to a particular zone of the particular media playback system, and wherein receiving the one or more messages that enable the playback device to join the particular media playback system comprises receiving a message that enables the playback device to join the particular zone of the particular media playback system to which the device base is assigned.

30. The non-transitory computer-readable medium of claim 29, wherein enabling the playback device to join the particular zone of the particular media playback system comprises causing the playback device to join a zone that consists of the playback device.

31. The non-transitory computer-readable medium of claim 29, wherein the particular zone is a first zone of a zone group that includes a second zone of one or more given playback devices, and wherein receiving the one or more messages that enable the playback device to join the particular media playback system comprises receiving an instruction that causes the playback device to join the zone group such that the playback device and the one or more given playback devices are configured to playback media in synchrony.

32. The non-transitory computer-readable medium of claim 28, wherein receiving the one or more messages that enable the playback device to join the particular media playback system comprises receiving an instruction that causes the playback device to join the particular media playback system while the playback device remains on the device base.

33. The non-transitory computer-readable medium of claim 32, wherein the operations further comprise:

detecting removal of the playback device from the device base; and responsively, disjoining the playback device from the particular media playback system.

* * * * *